United States Patent
Sakai et al.

(10) Patent No.: US 9,976,511 B2
(45) Date of Patent: May 22, 2018

(54) MULTICYLINDER ENGINE

(71) Applicant: TOYOTA JIDOSHA KABUSHIKI KAISHA, Toyota-shi, Aichi-ken (JP)

(72) Inventors: Hiroyuki Sakai, Gotemba (JP); Takeshi Ashizawa, Yokohama (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 210 days.

(21) Appl. No.: 15/139,619

(22) Filed: Apr. 27, 2016

(65) Prior Publication Data
US 2016/0319766 A1 Nov. 3, 2016

(30) Foreign Application Priority Data
Apr. 30, 2015 (JP) .................. 2015-093398

(51) Int. Cl.
*F02D 41/40* (2006.01)
*F02P 17/02* (2006.01)
(Continued)

(52) U.S. Cl.
CPC ......... *F02D 41/40* (2013.01); *F02D 41/0085* (2013.01); *F02D 41/2467* (2013.01);
(Continued)

(58) Field of Classification Search
CPC .. F02D 41/40; F02D 41/0085; F02D 41/2467; F02D 41/3023; F02D 41/3094; F02D 41/3029; F02D 2041/0015; F02D 2250/31; F02P 5/1512; F02P 17/02; Y02T 10/146; Y02T 10/46
(Continued)

(56) References Cited

U.S. PATENT DOCUMENTS 6,725,649 B2 * 4/2004 Yamashita ............ F02D 41/024
                                                                123/295
9,840,971 B2 * 12/2017 Glugla .................... F02D 17/02
(Continued)

FOREIGN PATENT DOCUMENTS

JP     2002-115595 A    4/2002
JP     2002-276421 A    9/2002
(Continued)

*Primary Examiner* — Lindsay Low
*Assistant Examiner* — John Bailey
(74) *Attorney, Agent, or Firm* — Hunton Andrews Kurth LLP

(57) ABSTRACT

A multicylinder engine includes a plurality of intake ports, a plurality of in-cylinder injectors, and an electronic control unit. The electronic control unit is configured to initially set a value of a control parameter of the multicylinder engine, individually for each of the cylinders, such that there is a common regularity between a distribution among the cylinders, of a difference of the value of the control parameter of each of the cylinders from the value of the control parameter of a reference cylinder, and a distribution among the cylinders, of a difference of the distance of a narrowed portion of each of the cylinders from the distance of the narrowed portion of a reference cylinder. The control parameter is a parameter that determines an air-fuel ratio of an air-fuel mixture around an ignition plug at a time of ignition in stratified charge combustion operation.

6 Claims, 15 Drawing Sheets

(51) Int. Cl.
*F02D 41/24* (2006.01)
*F02D 41/00* (2006.01)
*F02D 41/30* (2006.01)
*F02P 5/15* (2006.01)
*F02P 5/152* (2006.01)

(52) U.S. Cl.
CPC ..... *F02D 41/3023* (2013.01); *F02D 41/3094* (2013.01); *F02P 5/1512* (2013.01); *F02P 5/1522* (2013.01); *F02P 17/02* (2013.01); *F02D 41/3029* (2013.01); *F02D 2041/0015* (2013.01); *F02D 2250/31* (2013.01); *Y02T 10/146* (2013.01); *Y02T 10/46* (2013.01)

(58) Field of Classification Search
USPC ....... 123/299, 300, 480, 496, 499, 673, 443, 123/308, 429, 431, 432, 445, 447, 501, 123/512, 406.2–406.22, 406.24, 406.26, 123/406.27; 701/105; 73/114.45, 114.43, 73/114.63; 310/316.03; 324/384, 391, 324/506
See application file for complete search history.

(56) References Cited

U.S. PATENT DOCUMENTS

| | | | |
|---|---|---|---|
| 2001/0002591 A1* | 6/2001 | Majima | F02D 37/02 123/406.24 |
| 2001/0022169 A1* | 9/2001 | Tokuyasu | F02B 31/06 123/301 |
| 2002/0020387 A1* | 2/2002 | Nakayama | F02B 17/005 123/295 |
| 2002/0078919 A1* | 6/2002 | Yasuoka | F02B 17/005 123/295 |
| 2002/0129785 A1* | 9/2002 | Tetsuno | F02B 17/005 123/295 |
| 2003/0010313 A1* | 1/2003 | Fukuzumi | F02B 17/005 123/301 |
| 2003/0074890 A1* | 4/2003 | Yamashita | F02D 41/024 60/284 |
| 2003/0121495 A1* | 7/2003 | Abo | F02B 17/005 123/295 |
| 2006/0266326 A1* | 11/2006 | Yasunaga | F02D 37/02 123/299 |
| 2008/0135016 A1* | 6/2008 | Ashizawa | F02B 23/101 123/301 |
| 2008/0147301 A1* | 6/2008 | Irisawa | F02D 13/0226 701/103 |
| 2009/0071440 A1* | 3/2009 | Ashizawa | F02B 23/101 123/406.29 |
| 2009/0133668 A1* | 5/2009 | Ashizawa | F02B 23/10 123/305 |
| 2009/0194069 A1* | 8/2009 | Ashizawa | F02D 41/401 123/406.12 |
| 2009/0319156 A1* | 12/2009 | Fujikawa | F02B 23/104 701/103 |
| 2010/0057327 A1* | 3/2010 | Glugla | F02D 35/028 701/103 |
| 2016/0115880 A1* | 4/2016 | Kondo | F02D 41/1461 123/406.55 |
| 2016/0281589 A1* | 9/2016 | Ashizawa | F02B 23/10 |
| 2016/0298586 A1* | 10/2016 | Kimura | F02M 59/22 |

FOREIGN PATENT DOCUMENTS

| | | |
|---|---|---|
| JP | 2004-293429 A | 10/2004 |
| JP | 2005-061368 A | 3/2005 |
| JP | 2006-291876 A | 10/2006 |
| JP | 2008-002428 A | 1/2008 |
| JP | 2009-041397 A | 2/2009 |
| JP | 2009-275598 A | 11/2009 |
| JP | 2010-043603 A | 2/2010 |
| JP | 2010-184312 A | 8/2010 |

\* cited by examiner

FIG. 4
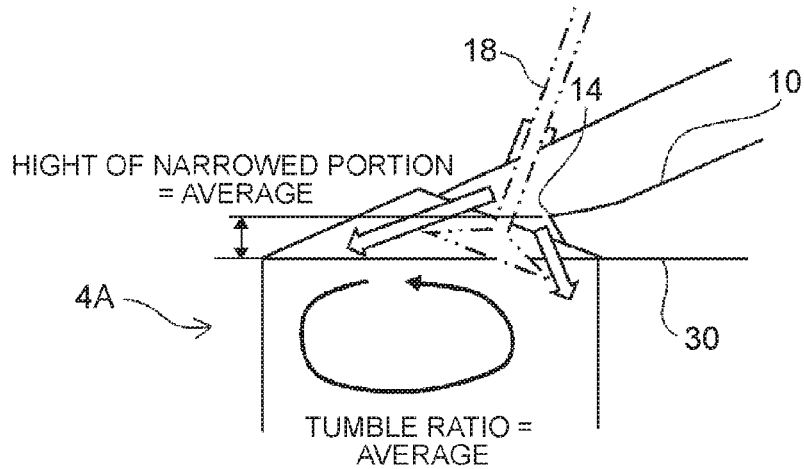
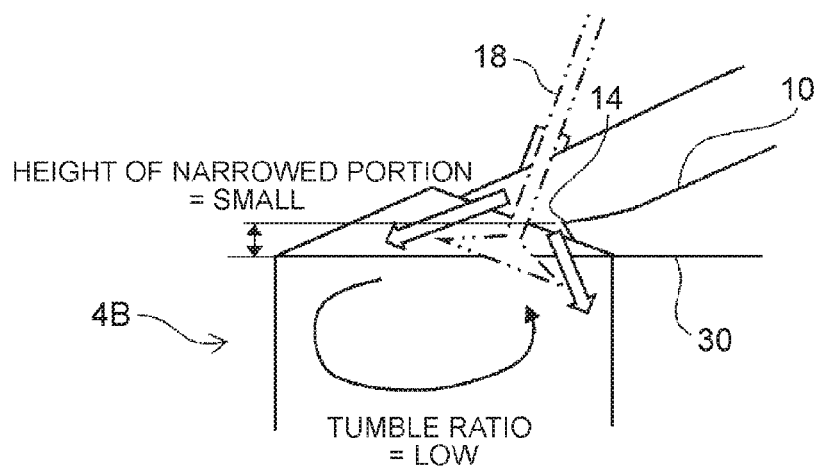
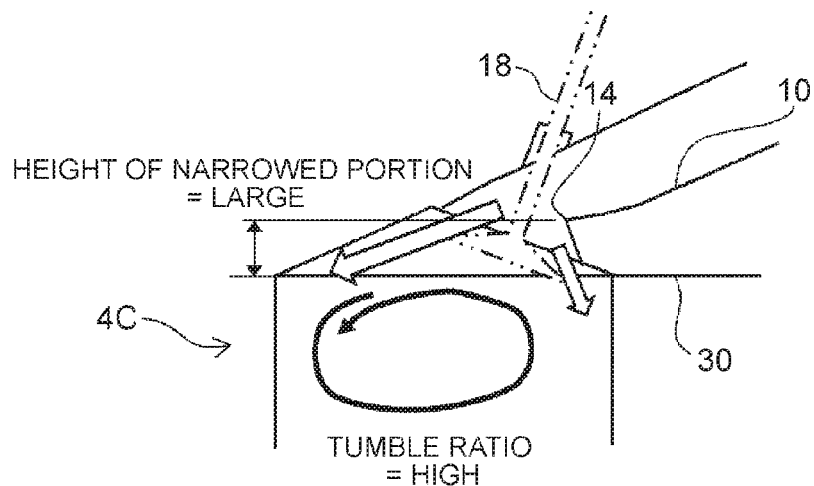

TUMBLE FLOW

MULTICYLINDER ENGINE

INCORPORATION BY REFERENCE

The disclosure of Japanese Patent Application No. 2015-093398 filed on Apr. 30, 2015 including the specification, drawings and abstract is incorporated herein by reference in its entirety.

BACKGROUND OF THE INVENTION

1. Field of the Invention

Embodiments of the present invention relate to a multicylinder engine having a plurality of cylinders, and in particular to a multicylinder engine in which each cylinder is provided with an intake port with a throat having a narrowed portion that produces tumble flow in a combustion chamber.

2. Description of Related Art

Air-guided stratified charge combustion is known. For this type of combustion, tumble flow is produced in a combustion engine, and fuel is injected from an in-cylinder injector against the tumble flow, so that the penetration force of fuel spray in the combustion chamber is controlled, and a layer of an air-fuel mixture having a high fuel concentration is formed around an ignition plug. In air-guided stratified charge combustion, the tumble flow and the fuel spray are balanced with each other so as to realize appropriate stratification of the air-fuel mixture, and achieve favorable ignition performance and combustion quality. However, if the tumble flow and the fuel spray are not balanced with each other, intended ignition performance and combustion quality cannot be obtained. This is because, if the penetration force of the fuel spray is relatively weak with respect to the strength of the tumble flow, the air-fuel mixture does not sufficiently reach the ignition plug by the ignition timing. Conversely, if the penetration force of the fuel spray is relatively strong with respect to the strength of the tumble flow, the air-fuel mixture passes around the ignition plug. Further, in a multicylinder engine such as an internal combustion engine for an automobile, the degree of imbalance between the tumble flow and the fuel spray is likely to differ among the cylinders, which results in variations in combustion among the cylinders.

One reason why the degree of imbalance between the tumble flow and the fuel spray differs among the cylinders in a multicylinder engine is an error in shape of an intake port of each cylinder. A cylinder head in which intake ports are formed is generally produced by casting. The intake ports and the combustion chambers to which the intake ports are connected are formed by separate cores. The cores of each intake port and the combustion chamber to which they are connected are combined with each other, placed in a casting mold, and fixed by core prints. However, it is difficult to completely fix the cores during pouring, and a slight displacement or misalignment may arise between the core of the intake port and the core of the combustion chamber. When the intake port is a tumble production port that is shaped so as to produce tumble flow, the slight displacement largely influences the strength of the tumble flow produced in the combustion chamber. Since the intake ports of the respective cylinders are formed by separate cores, the degree of displacement of the intake port relative to the corresponding combustion chamber differs from one cylinder to another. Therefore, the strength of the tumble flow varies among the cylinders, and, consequently, the degree of imbalance between the tumble flow and fuel spray differs among the cylinders.

A technology to correct the imbalance between the tumble flow and the fuel spray for each cylinder is disclosed in Japanese Patent Application Publication No. 2002-276421 (JP 2002-276421 A). According to this technology, the fuel injection pressure of the in-cylinder injector is forced to be changed during stratified charge combustion operation, and resulting combustion fluctuations are detected. Then, the fuel injection timing is corrected for each cylinder to reduce the degree of combustion fluctuations. In a cylinder in which the penetration force of the fuel spray is relatively weak with respect to the strength of the tumble flow, the fuel injection timing is advanced, so that the air-fuel mixture can reach the vicinity of the ignition plug earlier, in time for the ignition timing. Conversely, in a cylinder in which the penetration force of the fuel spray is relatively strong with respect to the strength of the tumble flow, the fuel injection timing is retarded, so that the air-fuel mixture reaches the vicinity of the ignition plug with a delay in accordance with the ignition timing.

SUMMARY

According to the technology described in JP 2002-276421 A, the fuel injection timing cannot be corrected for each cylinder until after combustion fluctuations are forced to be generated during stratified charge combustion operation, and it is determined whether the cylinder in question is a cylinder in which the penetration force of the fuel spray is relatively strong with respect to the strength of the tumble flow, or a cylinder in which the penetration force of the fuel spray is relatively weak with respect to the strength of the tumble flow. To effectively correct the fuel injection timing, it is necessary to check the balance between the strength of the tumble flow and the penetration force of the fuel spray for each cylinder, which takes a certain length of operating time after an engine leaves the production line. Also, in the case of an engine in which stratified charge combustion operation is only performed temporarily (e.g., an engine in which stratified charge combustion operation is performed only during start-up for the purpose of warm-up of a catalyst), there may not be sufficient time to check the balance as described above. Therefore, with the technology described in JP 2002-276421 A, variations in combustion among the cylinders due to the imbalance between the tumble flow and the fuel spray may still occur, at least for a while after the engine leaves the production line.

Embodiments of the present invention provide a multicylinder engine in which variations in combustion among cylinders caused by errors in shape of intake ports are suppressed or reduced from the time when the engine leaves the production line.

A multicylinder engine according to a first embodiment of the invention includes a plurality of intake ports, a plurality of in-cylinder injectors, and an electronic control unit. Each of the intake ports of the multicylinder engine is connected to a different cylinder of the multicylinder engine, and has a throat including a narrowed portion, such that tumble flow is produced in a combustion chamber of each of the cylinders of the multicylinder engine. A distance between the narrowed portion of the throat and a lower surface of the corresponding cylinder head varies among the cylinders of the multicylinder engine. Each of the cylinders of the multicylinder engine has an in-cylinder injector. Each in-cylinder injector is configured to inject a fuel against the tumble flow in the combustion chamber of the corresponding cylinder, such that stratified charge combustion operation using fuel injection by the in-cylinder injector is performed. The electronic control unit of the multicylinder engine is configured to initially set a value of a control parameter of the multicylinder engine, individually for each of the cylinders. This control parameter is initially set such that there is a common regularity between a distribution among the cylinders of a difference of the value of the control parameter of each of the cylinders from the value of the control parameter of a reference cylinder, and a distribution among the cylinders of a difference of the distance of the narrowed portion of each of the cylinders from the distance of the narrowed portion of a reference cylinder. This control parameter is a parameter that determines an air-fuel ratio of an air-fuel mixture around an ignition plug at a time of ignition in the stratified charge combustion operation of the multicylinder engine.

With the multicylinder engine according to the first embodiment of the invention, there is a common regularity between the distribution (first distribution) among cylinders of a difference of the value of the control parameter of each cylinder from the value of the control parameter of the reference cylinder, and the distribution (second distribution) among cylinders of a difference of the distance of the narrowed portion of each cylinder from the distance of the narrowed portion of the reference cylinder. The second distribution corresponds to a distribution among cylinders of the strength of tumble flow. Accordingly, if the control parameter is initially set for each cylinder so that there is a common regularity between the aforementioned first distribution and second distribution, a combustion condition can be made uniform or equal among the cylinders of the multicylinder engine, irrespective of variations in the strength of tumble flow among the cylinders. The reference cylinder is not particularly determined, as any one of the above-indicated plurality of cylinders may be selected as the reference cylinder.

In the multicylinder engine according to the first embodiment of the invention, the control parameter may be an ignition timing during the stratified charge combustion operation. The electronic control unit of the multicylinder engine may be configured to initially set a value of the control parameter of the multicylinder engine individually for each of the cylinders, such that, in a comparison of two cylinders out of the plurality of cylinders of the multicylinder engine, the ignition timing of the one of the two cylinders with the narrowed portion having a smaller distance is set to be more advanced than the ignition timing of the other cylinder with the narrowed portion having a larger distance. According to this setting, the ignition timing is retarded in the cylinder in which the tumble flow is strong, and the ignition timing is advanced in the cylinder in which the tumble flow is weak; therefore, the air-fuel ratio of the air-fuel mixture around the ignition plug at the time of ignition can be made uniform or substantially equal among the cylinders.

The multicylinder engine according to the first embodiment of the invention may further include a port injector provided in the intake port of each of the cylinders. These port injectors may be configured to inject the fuel into the intake ports, in which case the control parameter may be a ratio of a fuel injection amount provided by a port injector during the stratified charge combustion operation. The electronic control unit of the multicylinder engine may be configured to initially set a value of the control parameter of the multicylinder engine individually for each of the cylinders, such that, in a comparison of two cylinders out of the plurality of cylinders of the multicylinder engine, the ratio of the one of the two cylinders with the narrowed portion having a smaller distance is set to be larger than the ratio of the other cylinder with the narrowed portion having a larger distance. In the case where the total fuel injection amount is equal, as the port injection ratio is larger, the fuel injection amount of the in-cylinder injector is reduced, and the penetration force of fuel spray of the in-cylinder injector is reduced. Thus, according to this setting, the penetration force of fuel spray of the in-cylinder injector can be increased in the cylinder in which the tumble flow is strong, and the penetration force of fuel spray of the in-cylinder injector can be reduced in the cylinder in which the tumble flow is weak, so that the air-fuel ratio of the air-fuel mixture around the ignition plug at the time of ignition can be made uniform or substantially equal among the cylinders.

In the multicylinder engine according to the first embodiment of the invention, the control parameter may be a fuel injection pressure of the in-cylinder injector during the stratified charge combustion operation. The electronic control unit of the multicylinder engine may be configured to initially set a value of the control parameter of the multicylinder engine individually for each of the cylinders, such that, in a comparison of two cylinders out of the plurality of cylinders of the multicylinder engine, the fuel injection pressure of the one of the two cylinders with the narrowed portion having a smaller distance is set to be smaller than the fuel injection pressure of the other cylinder with the narrowed portion having a larger distance. According to this setting, the penetration force of fuel spray of the in-cylinder injector can be increased in the cylinder in which the tumble flow is strong, and the penetration force of fuel spray of the in-cylinder injector can be reduced in the cylinder in which the tumble flow is weak, so that the air-fuel ratio of the air-fuel mixture around the ignition plug at the time of ignition can be made uniform or substantially equal among the cylinders.

The multicylinder engine according to the first embodiment of the invention may further include a tumble control valve disposed in the intake port of each of the cylinders. These tumble control valves may be configured to change a strength of the tumble flow in the combustion chambers, such that the tumble flow becomes stronger as a rising angle of the tumble control valve is larger, in which case the control parameter may be the rising angle of the tumble control valve during the stratified charge combustion operation. The electronic control unit of the multicylinder engine may be configured to initially set a value of the control parameter of the multicylinder engine individually for each of the cylinders, such that, in a comparison of two cylinders out of the plurality of cylinders of the multicylinder engine, the rising angle of the one of the two cylinders with the narrowed portion having a smaller distance is set to be larger than the rising angle of the other cylinder with the narrowed portion having a larger distance. According to this setting, variations in the strength of tumble flow among the cylinders can be suppressed or reduced, so that the air-fuel ratio of the air-fuel mixture around the ignition plug at the time of ignition can be made uniform or substantially equal among the cylinders.

A multicylinder engine according to a second embodiment of the invention includes a plurality of intake ports and an electronic control unit. Each of the intake ports is connected to a different cylinder of the multicylinder engine, and has a throat including a narrowed portion, such that tumble flow is produced in a combustion chamber of each of the cylinders of the multicylinder engine. A distance between the narrowed portion of the intake port throat and a lower surface of the cylinder head varies among the cylinders of the multicylinder engine. The electronic control unit of the multicylinder engine may be configured to initially set a value of ignition timing during homogeneous combustion operation of the multicylinder engine, individually for each of the cylinders, such that, in a comparison of two cylinders out of the plurality of cylinders, the ignition timing of the one of the two cylinders with the narrowed portion having a smaller distance during the homogeneous combustion operation is set to be more advanced than the ignition timing of the other cylinder with the narrowed portion having a larger distance during the homogeneous combustion operation. In a cylinder in which tumble flow is strong, the MBT crank angle is retarded since the combustion velocity is high. In a cylinder in which tumble flow is weak, the MBT crank angle is advanced since the combustion velocity is low. Thus, according to this setting, the ignition timing can be made close to the MBT crank angle, no matter whether strong tumble flow or weak tumble flow is produced in the cylinder, so that variations in combustion are less likely or unlikely to arise among the cylinders.

In the multicylinder engines according to the first embodiment and second embodiment of the invention, a combustion condition can be made uniform among the cylinders, irrespective of variations in the strength of tumble flow among the cylinders. Therefore, variations in combustion among the cylinders due to variations in the strength of tumble flow among the cylinders caused by errors in shape of intake ports are suppressed or reduced from the time when the multicylinder engine leaves the production line.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a view useful for explaining the reason why the tumble ratio changes depending on the height of a narrowed portion of a throat of an intake port;

DETAILED DESCRIPTION OF EMBODIMENTS

Some embodiments of the invention will be described with reference to the drawings. When a number, such as the number of pieces, numerical quantity, quantity, or range, of each element is mentioned in the embodiments indicated below, it is to be understood that the invention is not limited to the number mentioned, unless it is particularly stated otherwise. Also, the structures described in the embodiments indicated below are not necessarily essential to this invention, unless it is particularly stated otherwise.

Figure 1:
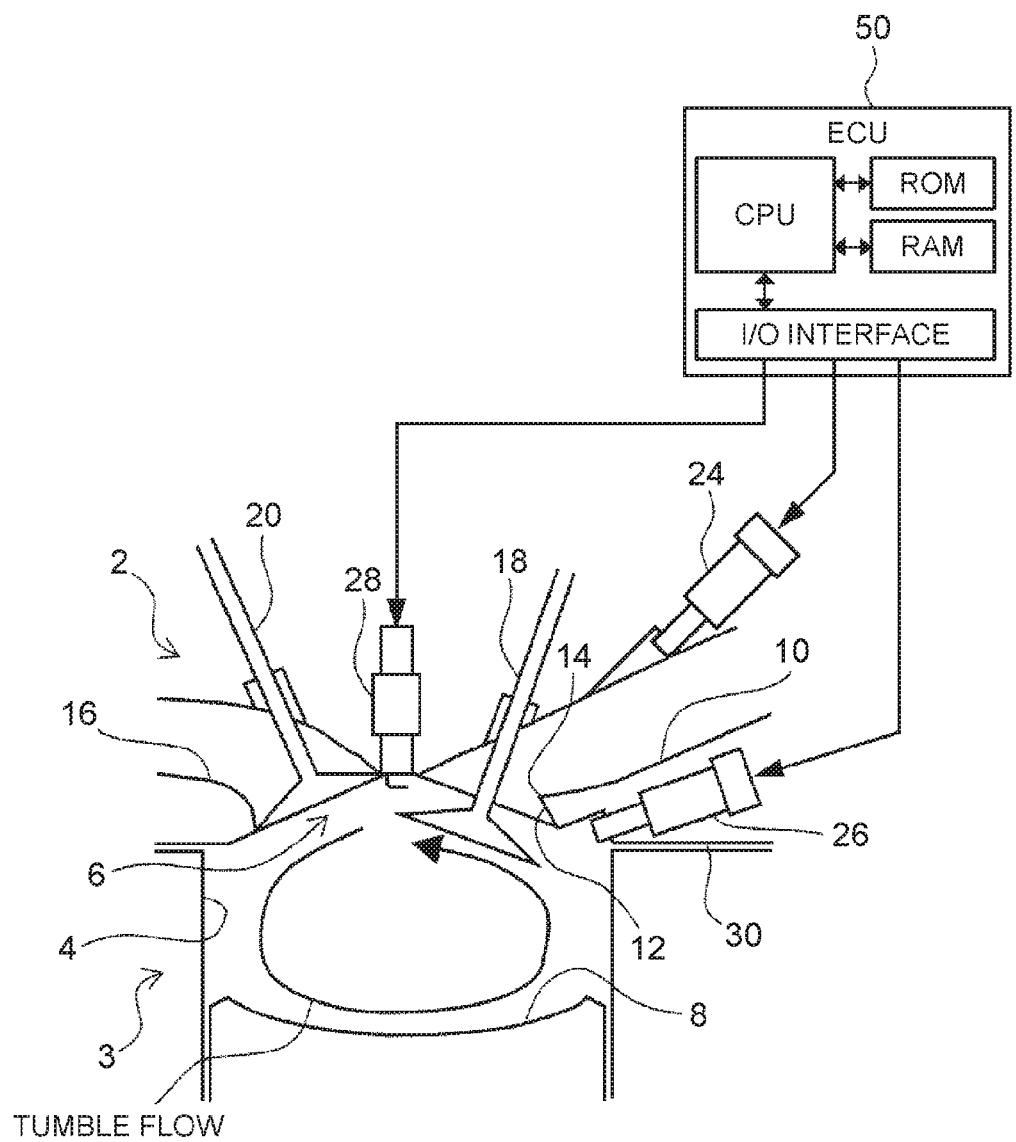
FIG. 1 is a view schematically showing the configuration of a multicylinder engine according to a first embodiment of the invention.

FIG. 1 schematically shows the configuration of a multicylinder engine (which will be simply called "engine") according to a first embodiment of the invention. In FIG. 1, elements or components that constitute the engine are depicted while being projected on one plane perpendicular to the crankshaft (it is to be noted that FIG. 1 is not a cross-sectional view in which a particular cross-section of the engine is depicted). While only one cylinder 4 is depicted in FIG. 1, the engine includes two or more cylinders 4. The engine has a cylinder block 3 in which the cylinders 4 are formed, and a cylinder head 2 mounted on the cylinder block 3 via a gasket (not shown). A piston 8 is disposed in each of the cylinders 4 such that the piston 8 can reciprocate in the axial direction. A pent-roof shaped combustion chamber 6 as an upper space of the cylinder 4 is formed at a mating surface 30 that mates to the cylinder block 3 and corresponds to a lower surface of the cylinder head 2.

An intake port 10 and an exhaust port 16, which communicate with the combustion chamber 6, are provided in the cylinder head 2. An intake valve 18 is provided at an opening of the intake port 10 which communicates with the combustion chamber 6, and an exhaust valve 20 is provided at an opening of the exhaust port 16 which communicates with the combustion chamber 6. Although not illustrated in the drawings, the intake port 10 branches into two channels at a point between the inlet formed in a side face of the cylinder head 2 and the opening that communicates with the combustion chamber 6. A port injector 24 that injects fuel into the intake port 10 is provided in a portion of the intake port 10 upstream of the branching point. An in-cylinder injector 26 that injects the fuel into the combustion chamber 6 is provided between the two channels of the intake port 10, at a location interposed between the intake port 10 and the mating surface 30 of the cylinder block, such that a distal end of the in-cylinder injector 26 is exposed to the combustion chamber 6. Also, an ignition plug 28 is provided in the cylinder head 2 such that it protrudes from the top of the combustion chamber 6 into the interior thereof.

The intake port 10 extends substantially straight from its inlet toward the combustion chamber 6, and the channel cross-sectional area is narrowed or reduced at a throat 12 as a connecting portion with the combustion chamber 6. With the intake port 10 thus shaped, tumble flow is produced in intake air drawn into the combustion chamber 6. A recess for keeping the tumble flow is formed in the piston 8 that forms a bottom of the combustion chamber 6. During operation at an air-fuel ratio that is leaner than the stoichiometric air-fuel ratio, air-guided stratified charge combustion involving in-cylinder injection is carried out. For the air-guided stratified charge combustion, the fuel is injected from the in-cylinder injector 26, against the tumble flow produced in the combustion chamber 6. Since braking force of the tumble flow acts on a fuel spray of the in-cylinder injector 26, the behavior of the fuel spray in the combustion chamber 6 is controlled, and a layer of an air-fuel mixture having a high concentration of fuel is formed around the ignition plug 28.

The engine includes an ECU (Electronic Control Unit) 50 as a controller. The ECU 50 has at least an input/output interface, ROM, RAM, and CPU. The input/output interface is provided for receiving sensor signals from various sensors mounted in the engine and the vehicle, and outputting operation signals to actuators provided in the engine. Various types of control data including various control programs and maps for controlling the engine are stored in the ROM. Set values (initial set values) of a control parameter which will be described later are also stored in advance in the ROM. The CPU reads the control programs from the ROM, and executes the programs, so as to produce operation signals based on the received sensor signals.

The strength of the tumble flow produced in the combustion chamber 6 may be evaluated using an index called "tumble ratio". The tumble ratio is defined as the number of rotations of tumble flow in the combustion chamber 6 while the piston 8 reciprocates once (i.e., during one reciprocation of the piston 8). The tumble ratio has an influence on a length of time it takes until the fuel injected from the in-cylinder injector 26 reaches the vicinity of the ignition plug 28.

Figure 2:
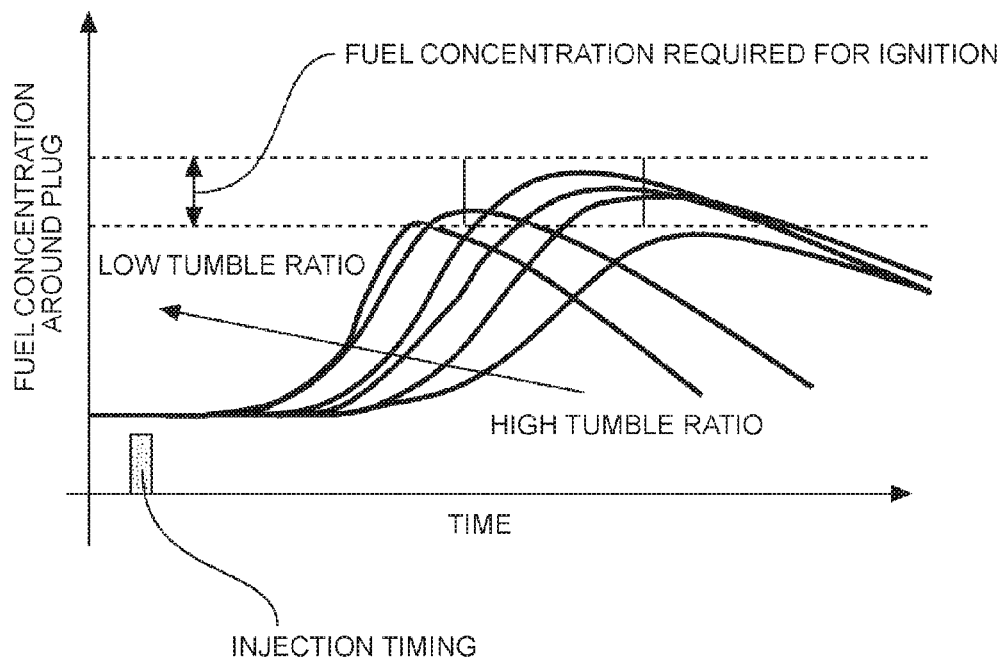
FIG. 2 is a view showing changes in the fuel concentration around an ignition plug with respect to time, from the time of in-cylinder injection in stratified charge combustion operation.

FIG. 2 shows changes in the fuel concentration around the ignition plug with time, from the timing of in-cylinder injection. While a plurality of curves are depicted in FIG. 2, the tumble ratio differs from one curve to another. The fuel concentration around the ignition plug reaches its peak earlier as the tumble ratio is lower, and it takes a longer time until the fuel concentration around the ignition plug reaches its peak as the tumble ratio is higher. Also, the level of the tumble ratio has an influence on the height of the peak of the fuel concentration, and the peak of the fuel concentration is reduced when the tumble ratio is too high or too low.

Figure 3:
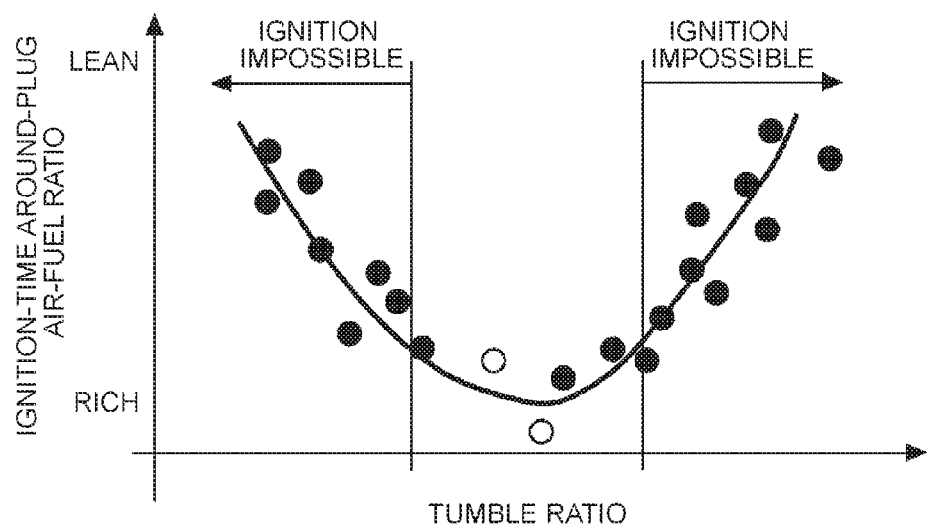
FIG. 3 is a view indicating the relationship between the tumble ratio and the air-fuel ratio of an air-fuel mixture around the ignition plug at the time of ignition in stratified charge combustion operation.

FIG. 3 shows the relationship between the tumble ratio and the air-fuel ratio of the air-fuel mixture around the ignition plug at the time of ignition (which will be called "ignition-time around-plug air-fuel ratio"), when the engine speed, load, and the ignition timing are fixed. As is understood from FIG. 3, the ignition-time around-plug air-fuel ratio changes quadratically along a parabolic curve, against the tumble ratio. Namely, if the tumble ratio is within a given appropriate range, a layer of an air-fuel mixture having a high fuel concentration can be formed around the ignition plug at the time of ignition. However, if the tumble ratio is outside the appropriate range, the ignition-time around-plug air-fuel ratio is increased (i.e., becomes lean). This is consistent with the relationship between changes in the fuel concentration around the ignition plug with time, and the tumble ratio.

The air-fuel ratio of the air-fuel mixture around the ignition plug at the time of ignition differs depending on the tumble ratio, because the force with which the tumble flow brakes the penetration force of fuel spray varies depending on the tumble ratio. When the braking force produced by the tumble flow and the penetration force of fuel spray are balanced with each other, a layer of an air-fuel mixture having a high fuel concentration is formed around the ignition plug 28 at the time of ignition. However, when the tumble ratio is higher than the appropriate range, the braking force produced by the tumble flow becomes excessively large in relation to the penetration force of fuel spray; therefore, the air-fuel mixture having a high fuel concentration does not sufficiently reach the ignition plug 28 by the ignition timing. Conversely, when the tumble ratio is lower than the appropriate range, the braking force produced by the tumble flow becomes insufficient relative to the penetration force of fuel spray; therefore, the air-fuel mixture having a high fuel concentration passes over the vicinity of the ignition plug 28. Thus, no matter whether the tumble ratio is higher or lower than the appropriate range, the ignition-time around-plug air-fuel ratio becomes lean.

Referring back to FIG. 1, the intake port 10 will be described in greater detail. The tumble ratio deviates from the appropriate range because of an error in shape of the intake port 10. The cylinder head 2 is produced by casting. In the production, the combustion chambers 6, intake ports 10 and exhaust ports 16 are respectively formed by use of separate cores. Focusing on one intake port 10, the shape of a portion of the intake port 10 which is connected to the combustion chamber 6, namely, the shape of the throat 12, is created by machining after casting. The throat 12 is formed with a valve seat on which the intake valve 18 is seated. A narrowed portion 14 having the minimized channel cross-sectional area is formed between a main body portion of the intake port 10 formed by use of a core, and the throat 12 formed by machining.

During pouring for the cylinder head 2, the cores used for forming the intake ports 10 are fixed or supported by outer frames and core prints, to be positioned relative to the cores used for forming the combustion chambers 6. However, it is difficult to completely fix the cores, and a slight misalignment or displacement may arise in the positional relationship between the core of each intake port 10 and the core of the corresponding combustion chamber 6. Since the intake port 10 is a tumble production port, the slight displacement of the cores has a large influence on the strength of the tumble flow produced in the combustion chamber 6.

When the core of the intake port 10 is displaced in the vertical direction, the displacement appears as a difference in the distance of the narrowed portion 14 of the throat 12 from the cylinder block mating surface 30 when the throat 12 is formed by machining. Here, the narrowed portion 14 is a circular ring that provides a boundary between the throat 12 and a main body portion of the intake port 10, and the distance of the narrowed portion 14 is the shortest distance from the lower end (a portion closest to the cylinder head mating surface 30) of the circular ring to the cylinder head mating surface 30. The distance of the narrowed portion 14 of the throat 12 from the cylinder block mating surface 30 can be easily measured by use of a laser measuring instrument.

The "distance" of the narrowed portion 14 of the throat 12 may be expressed as "height" of the narrowed portion 14 when the cylinder head 2 is placed such that the cylinder block mating surface 30 lies in a horizontal plane. The statement that the height of the narrowed portion 14 is small means that the distance of the narrowed portion 14 is short, and the statement that the height of the narrowed portion 14 is large means that the distance of the narrowed portion 14 is long. In FIG. 4, three cylinders 4A, 4B, 4C with the narrowed portions 14 of the throats 12 having different heights are depicted. The height of the narrowed portion 14 of the cylinder 4A is the average of those of all of the cylinders, and the height of the narrowed portion 14 of the cylinder 4B is smaller than the average of those of all of the cylinders, while the height of the narrowed portion 14 of the cylinder 4C is larger than the average of those of all of the cylinders.

In the cylinder 4B in which the height of the narrowed portion 14 is smaller than the average height, intake air flow that enters the combustion chamber 6 after passing the upper part of the intake valve 18, and produces tumble flow in the forward direction, is weakened, while intake air flow that enters the combustion chamber 6 after passing the lower part of the intake valve 18, and produces tumble flow in the reverse direction, is intensified. As a result, tumble flow that is weaker than tumble flow produced in the cylinder 4A (or tumble flow having a smaller tumble ratio) is produced in the cylinder 4B. On the other hand, in the cylinder 4C in which the height of the narrowed portion 14 is larger than the average height, intake air flow that enters the combustion chamber 6 after passing the upper part of the intake valve 18, and produces tumble flow in the forward direction, is intensified, while intake air flow that enters the combustion chamber 6 after passing the lower part of the intake valve 18, and produces tumble flow in the reverse direction, is weakened. As a result, tumble flow that is stronger than tumble flow produced in the cylinder 4A (or tumble flow having a large tumble ratio) is produced in the cylinder 4C.

Figure 5:
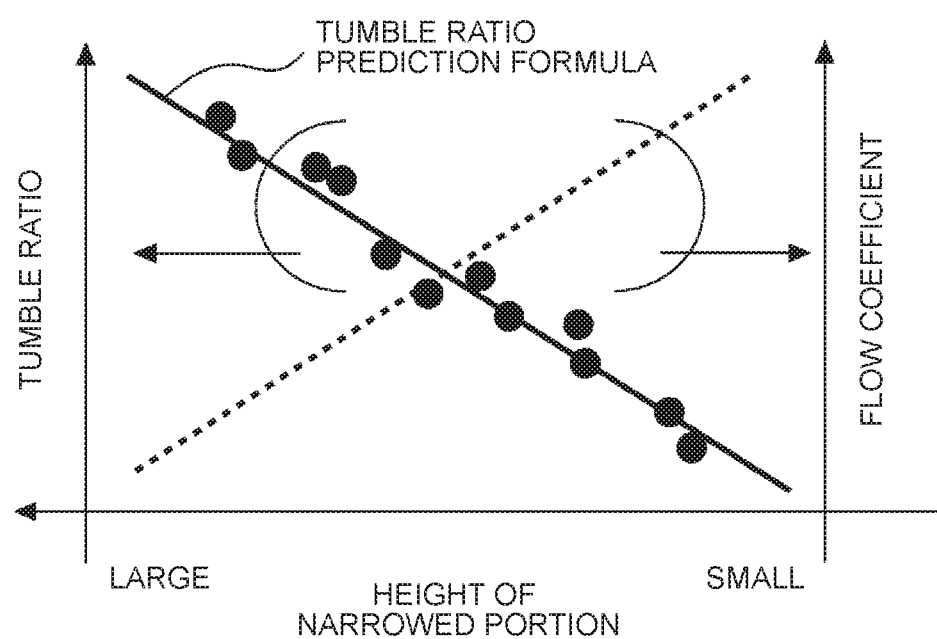
FIG. 5 is a view indicating the relationship among the height of the narrowed portion of the throat of the intake port, tumble ratio, and the flow coefficient.

It follows that whether strong tumble flow or weak tumble flow is produced in a certain cylinder 4 can be determined from the height of the narrowed portion 14 of the throat 12 of the intake port 10 of the cylinder 4 as measured from the cylinder block mating surface 30. FIG. 5 shows results of investigation of the relationship between the height of the narrowed portion 14 and the tumble ratio. The investigation was conducted on a plurality of engines actually produced on a production line, and the tumble ratio was measured under a given rotational speed and a given load. The tumble ratio was measured with a Tipplemann tumble measurement system, and the height of the narrowed portion 14 was measured with a laser measuring instrument, in a condition where the cylinder head 2 was detached from the cylinder block 3.

It is understood from FIG. 5 that there is a linear relationship between the tumble ratio and the height of the narrowed portion 14. With this relationship expressed by a prediction formula, a predicted value of the tumble ratio can be calculated according to the prediction formula once the height of the narrowed portion 14 is found. FIG. 5 also shows results of investigation of the relationship between the height of the narrowed portion 14 and the flow coefficient. There is also a linear relationship between the flow coefficient and the height of the narrowed portion 14, and the flow coefficient is reduced as the height of the narrowed portion 14 is larger.

The measurement of the height of the narrowed portion 14 is carried out for each lot, and for each cylinder 4, in the production process of the cylinder head 2. With this measurement thus carried out, variations in the strength of tumble flow among the cylinders 4, which are caused by errors in shape of the intake ports 10, can be predicted in the stage of production of the cylinder head 2. Since two intake valves 18 are provided for one combustion chamber 6, there are two throats 12 of the intake port 10 for one combustion chamber 6. The height of the narrowed portion 14 may be measured with respect to the narrowed portion 14 of either one of the throats 12 (preferably, a predetermined one, e.g., the right-side one), or may be measured with respect to the narrowed portions 14 of both of the throats 12. In the latter case, the average value of the measurement results may be obtained.

In the related art, a value (design value) that is standardized among the cylinders 4 is used as the ignition timing during air-guided stratified charge combustion operation (which will be simply called "stratified charge combustion operation"), in particular, as the ignition timing that is initially set without being learned or corrected based on operation results. The ignition timing is initially set to a time at which the fuel concentration around the ignition plug reaches its peak, when the tumble ratio is equal to a design value. However, a difference between the design value and actual value of the tumble ratio arises from an error in shape of the intake port 10, and a time difference corresponding to the difference between the design value and actual value of the tumble ratio arises between the time at which the fuel concentration around the ignition plug reaches the peak, and the ignition timing. Therefore, when there are variations in the tumble ratio among the cylinders 4, the ignition-time around-plug air-fuel ratio differs from one cylinder 4 to another.

Referring again to FIG. 2 mentioned above, the length of time it takes until the fuel concentration around the ignition plug reaches its peak varies largely depending on the tumble ratio. However, there are no large differences in the peak value of the fuel concentration, as long as it is within a range of fuel concentration required for ignition. Thus, the ignition-time around-plug air-fuel ratio is presumed to be substantially uniform or equal, if setting of the ignition timing is changed for each cylinder 4 according to the tumble ratio, so that the time at which the fuel concentration around the ignition plug reaches the peak coincides with the ignition timing.

It is understood from the graph shown in FIG. 2 that, if the ignition timing is set to the time at which the fuel concentration around the ignition plug reaches the peak, the ignition timing may be more retarded than the design value as the tumble ratio is higher than the design value, and the ignition timing may be more advanced than the design value as the tumble ratio is lower than the design value. By checking the time it takes until the fuel concentration around the ignition plug reaches the peak while varying the level of the tumble ratio, it is possible to obtain data (represented by a relational expression, for example) indicating the relationship between the tumble ratio, and an optimum value of the ignition timing corresponding to the tumble ratio.

Figure 6:
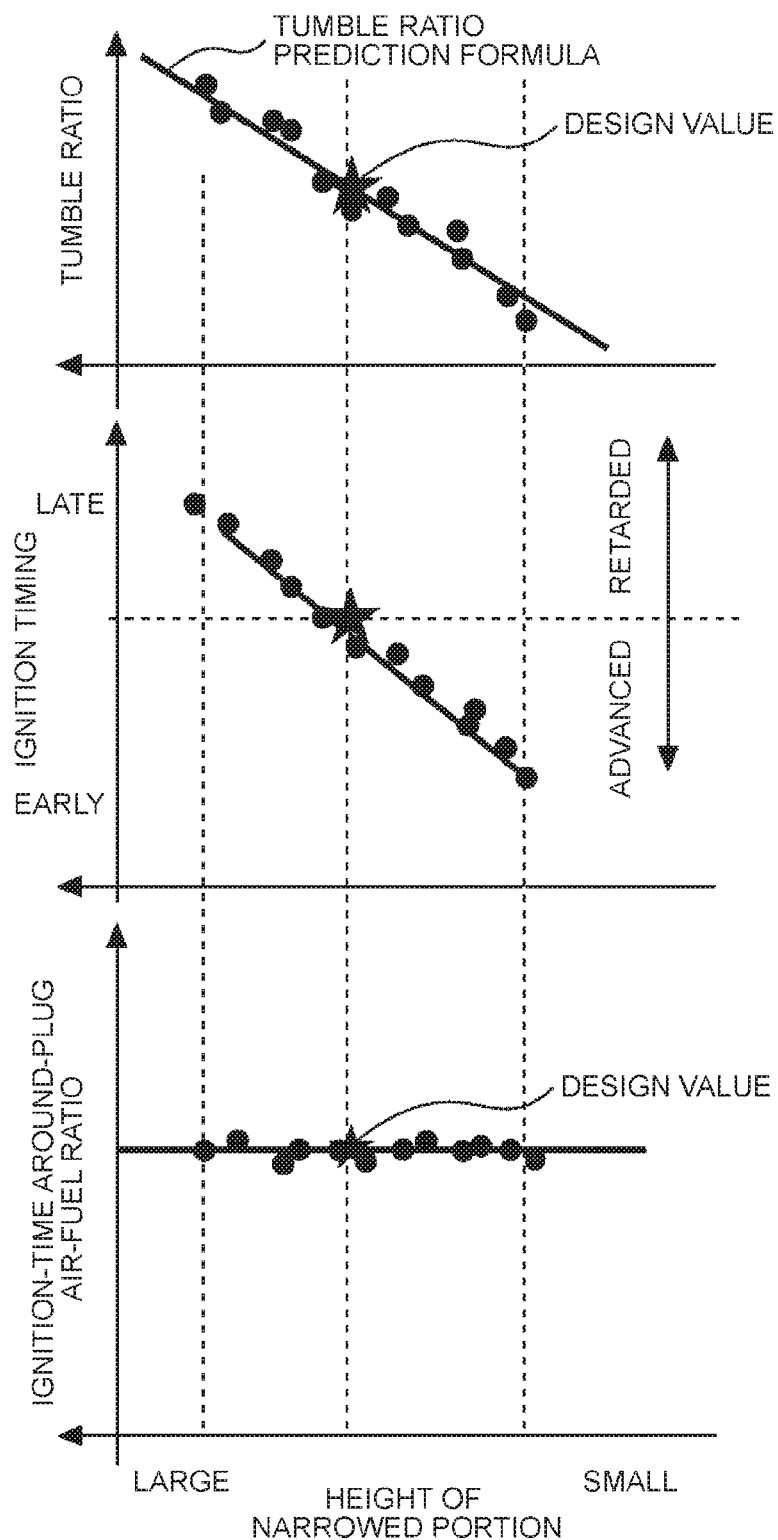
FIG. 6 is a view indicating the relationship between the height of the narrowed portion of the throat of the intake port and the ignition timing, for making the air-fuel ratio of the air-fuel mixture around the ignition plug at the time of ignition uniform or substantially equal among the cylinders.

Once the data indicating the relationship between the tumble ratio and the optimum value of the ignition timing is obtained, it is possible to obtain data for determining an optimum value of the ignition timing from the height of the narrowed portion 14, by using the prediction formula representing the relationship between the tumble ratio and the height of the narrowed portion 14. In FIG. 6, three graphs in which the horizontal axis indicates the height of the narrowed portion 14 are arranged such that their horizontal axes extend in parallel with each other. The upper graph indicates the relationship between the height of the narrowed portion 14 and the tumble ratio. The middle graph indicates the relationship between the height of the narrowed portion 14 and the optimum value of the ignition timing. The lower graph indicates the relationship between the height of the narrowed portion 14, and the ignition-time around-plug air-fuel ratio in the case where the ignition timing is set to a value indicated in the middle graph. Black circles indicated in each graph are data obtained by an experiment in which the height of the narrowed portion 14 is varied. It is understood from FIG. 6 that the ignition-time around-plug air-fuel ratio can be controlled to be substantially equal to the design value, by changing setting of the ignition timing in accordance with the height of the narrowed portion 14.

In the production process of the engine, the relationship between the height of the narrowed portion 14 and the optimum value of the ignition timing indicated in the middle graph of FIG. 6 is prepared in advance as reference data for determining the ignition timing for each cylinder 4. The ignition timing adequate as a set value for use during stratified charge combustion operation can be determined for each cylinder 4, from the reference data and the height of the narrowed portion 14 measured for each cylinder 4. The thus determined ignition timing of each cylinder 4 is written as a set value (initial set value) in the ROM of the ECU 50. The cylinder head 2 and the ECU 50 are linked to each other in the production process of the engine, so that the height of the narrowed portion 14 thus measured corresponds to the set value of the ignition timing written in the ROM.

Figure 7:
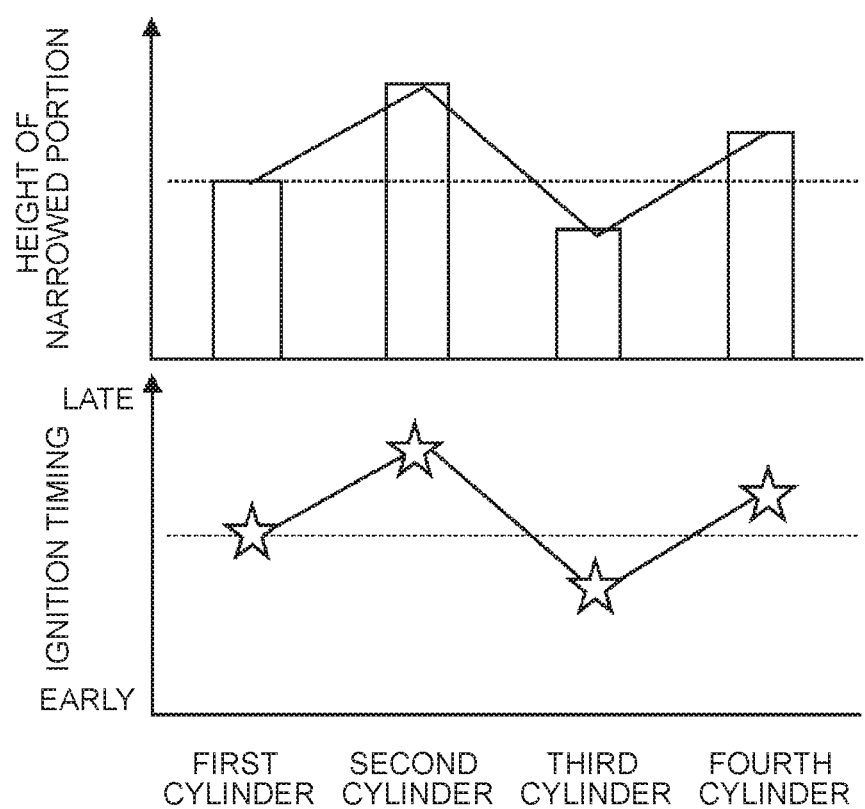
FIG. 7 is a view indicating one example of the relationship between a set value of the ignition timing of each cylinder stored in ROM of the first embodiment, and the height of the narrowed portion of the throat of the intake port of each cylinder.

FIG. 7 shows one example of the relationship between the height of the narrowed portion 14 of each cylinder 4, and the set value of the ignition timing of each cylinder 4 stored in the ROM. In this example, the engine is a four-cylinder engine, and the upper graph indicates the height of the narrowed portion 14 of each cylinder 4, while the lower graph indicates the set value of the ignition timing of each cylinder 4. If a first cylinder is denoted as a reference cylinder, and a distribution (indicated by a broken line in the lower graph) among cylinders, of a difference of the set value of the ignition timing of each cylinder from the set value of the ignition timing of the reference cylinder is compared with a distribution (indicated by a broken line in the upper graph) among cylinders, of a difference of the height of the narrowed portion 14 of each cylinder from the height of the narrowed portion 14 of the reference cylinder, it can be confirmed that there is a common regularity among the two distributions. At least when a vehicle is operated for the first time after leaving the production line, setting (initial setting) the ignition timing is performed according to the set values stored in the ROM. According to the initial setting, in a comparison of two cylinders out of the four cylinders included in the engine, the ignition timing of the cylinder with the narrowed portion 14 having the smaller height is set to be more advanced than the ignition timing of the cylinder with the narrowed portion 14 having the larger height.

Thus, if the ignition timing of each cylinder 4 is individually set according to the height of the narrowed portion 14, the ignition-time around-plug air-fuel ratio as a combustion condition can be made substantially equal among the cylinders 4, irrespective of variations in the strength of tumble flow among the cylinders 4. Thus, in the engine of this embodiment, even if the strength of tumble flow varies among the cylinders 4 due to errors in shape of the intake ports 10, variations in combustion among the cylinders 4 caused by variations in the strength of tumble flow are suppressed or reduced from the time when the engine leaves the production line.

While the ignition timing is determined from the height of the narrowed portion 14 in this embodiment, a correction coefficient for the design value of the ignition timing may be determined from the height of the narrowed portion 14. The correction coefficient is set to a value that retards the ignition timing from the design value when the height of the narrowed portion 14 is larger than the design value, and the correction coefficient is set to a value that advances the ignition timing from the design value when the height of the narrowed portion 14 is smaller than the design value. The correction coefficient is determined for each cylinder 4 from the height of the narrowed portion 14, and is written in the ROM of the ECU 50 along with the design value of the ignition timing. The ECU 50 corrects the design value of the ignition timing with the correction coefficient for each cylinder 4, and uses the ignition timing thus corrected as a set value of the ignition timing for each cylinder 4.

Also, the logic for calculating a set value of the ignition timing from the height of the narrowed portion 14, and a measurement value of the height of the narrowed portion 14 of each cylinder 4, may be written into the ROM of the ECU 50, and the ECU 50 may calculate a set value of the ignition timing for each cylinder 4. In this case, workers are only required to measure the height of the narrowed portion 14, and man-hours for calculating the ignition timing or correction coefficient for each cylinder 4 from the height of the narrowed portion 14 can be advantageously reduced.

An engine according to a second embodiment of the invention has the configuration as shown in FIG. 1, like the engine of the first embodiment. However, the engine according to the second embodiment is different from that of the first embodiment in the content of control parameters stored in the ROM of the ECU 50, as will be described later.

In the engine of this embodiment, operation using only port injection by the port injector 24, operation using only in-cylinder injection by the in-cylinder injector 26, or operation using both port injection and in-cylinder injection, can be selected and used, according to an operating region of the engine. During stratified charge combustion operation, in-cylinder injection by the in-cylinder injector 26 is mainly performed, and both port injection and in-cylinder injection are used.

The ratio of the fuel injection amount provided by the port injector 24 (which will be called "intake port injection ratio") during stratified charge combustion operation influences the penetration force of fuel spray of the in-cylinder injector 26. As the intake port injection ratio is reduced, the fuel injection amount provided by the in-cylinder injector 26 increases accordingly, and the penetration force of fuel spray of the in-cylinder injector 26 increases. Conversely, if the intake port injection ratio is increased, the fuel injection amount provided by the in-cylinder injector 26 is reduced accordingly, and the penetration force of fuel spray of the in-cylinder injector 26 is reduced. Therefore, the balance between the penetration force of fuel spray of the in-cylinder injector 26 and the braking force produced by tumble flow produced in the combustion chamber 6 changes, depending on the magnitude of the intake port injection ratio.

In the related art, a value (design value) that is standardized among the cylinders 4 is used as the intake port injection ratio during stratified charge combustion operation, in particular, as the intake port injection ratio that is initially set without being learned or corrected based on operation results. However, if the intake port injection ratio is individually set for each cylinder 4, the balance between the penetration force of the fuel spray and the braking force produced by the tumble flow can be controlled for each cylinder 4. If the setting of the intake port injection ratio is changed for each cylinder 4 according to the tumble ratio, and the balance between the penetration force of the fuel spray and the braking force produced by the tumble flow is controlled for each cylinder 4, so that the fuel concentration around the ignition plug reaches its peak at the ignition timing, the ignition-time around-plug air-fuel ratio can be made substantially uniform or equal among the cylinders 4.

In this embodiment, as a specific method of changing the setting of the intake port injection ratio for each cylinder 4, the in-cylinder injection ratio as the ratio of the fuel injection amount provided by the in-cylinder injector 26 is multiplied by a correction coefficient set for each cylinder 4. A base value of the in-cylinder injection ratio is a variable value that can be changed according to the engine speed and the engine load, and a common value is used as the base value among the cylinders 4. When the height of the narrowed portion 14 is equal to the design value, the value of the in-cylinder injection ratio correction coefficient is set to 1. When the height of the narrowed portion 14 is larger than the design value, the in-cylinder injection ratio correction coefficient is set to a value larger than 1, and the value of the in-cylinder injection ratio correction coefficient is increased to be larger as the height of the narrowed portion 14 is larger. Conversely, when the height of the narrowed portion 14 is smaller than the design value, the in-cylinder injection ratio correction coefficient is set to a value smaller than 1, and the value of the in-cylinder injection ratio correction coefficient is reduced to be smaller as the height of the narrowed portion 14 is smaller. Thus, it is possible to balance the penetration force of the fuel spray of the in-cylinder injector 26 with the strength of the tumble flow produced in the combustion chamber 6, by changing the value of the in-cylinder injection ratio correction coefficient, according to the height of the narrowed portion 14.

In the production process of the engine of this embodiment, the relationship between the height of the narrowed portion 14 and the optimum value of the in-cylinder injection ratio correction coefficient, which was previously determined, is prepared in advance as reference data for determining the in-cylinder injection ratio correction coefficient for each cylinder 4. The in-cylinder injection ratio correction coefficient adequate for determining the set values of the in-cylinder injection ratio and the port injection ratio during stratified charge combustion operation can be determined for each cylinder 4 from the reference data and the height of the narrowed portion 14 measured for each cylinder 4. The in-cylinder injection ratio correction coefficient thus determined for each cylinder 4 is written into the ROM of the ECU 50.

Figure 8:
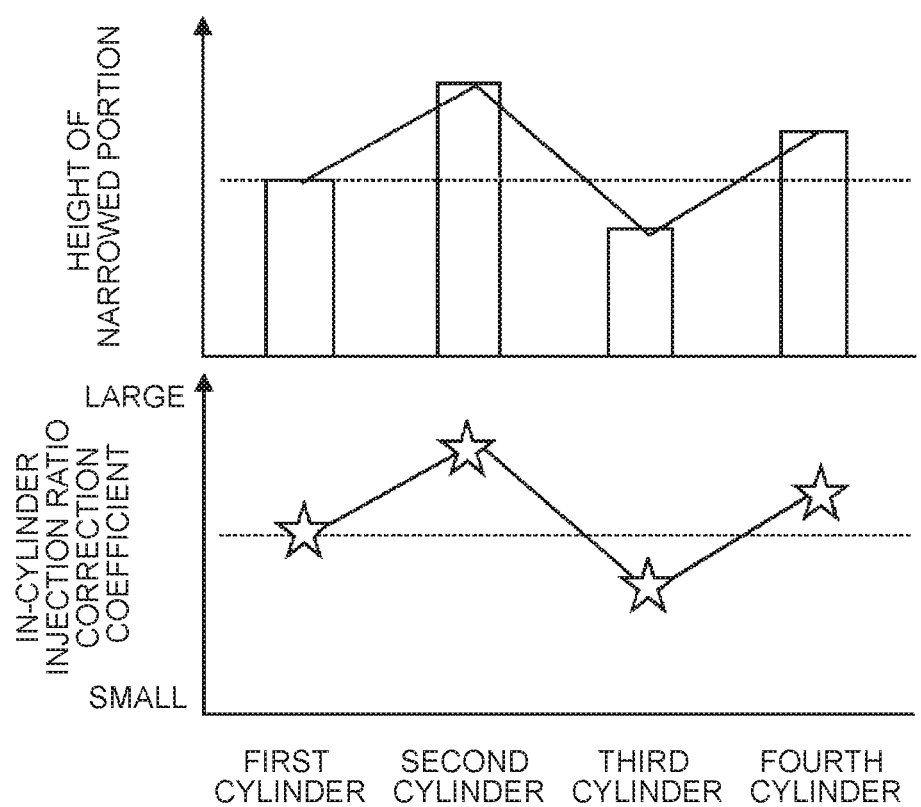
FIG. 8 is a view indicating one example of the relationship between a set value of an in-cylinder injection ratio correction coefficient of each cylinder stored in ROM of a second embodiment of the invention, and the height of the narrowed portion of the throat of the intake port of each cylinder.

FIG. 8 shows one example of the relationship between the height of the narrowed portion 14 of each cylinder 4, and the in-cylinder injection ratio correction coefficient of each cylinder 4 stored in the ROM. In this example, the engine is a four-cylinder engine, and the upper graph indicates the height of the narrowed portion 14 of each cylinder 4, while the lower graph indicates the in-cylinder injection ratio correction coefficient for each cylinder 4. If a first cylinder is denoted as a reference cylinder, and a distribution (indicated by a broken line in the lower graph) among cylinders, of a difference of the in-cylinder injection ratio correction coefficient of each cylinder from the in-cylinder injection ratio correction coefficient of the reference cylinder is compared with a distribution (indicated by a broken line in the upper graph) among cylinders, of a difference of the height of the narrowed portion 14 of each cylinder from the height of the narrowed portion 14 of the reference cylinder, it can be confirmed that there is a common regularity between the two distributions. At least when a vehicle is operated for the first time after leaving the production line, the in-cylinder injection ratio and the port injection ratio are set (initially set) using the in-cylinder injection ratio correction coefficient stored in the ROM. According to the initial setting, in a comparison of two cylinders out of the four cylinders included in the engine, the port injection ratio of the cylinder with the narrowed portion 14 having the smaller height is set to a larger value than the port injection ratio of the cylinder with the narrowed portion 14 having the larger height.

Figure 9:
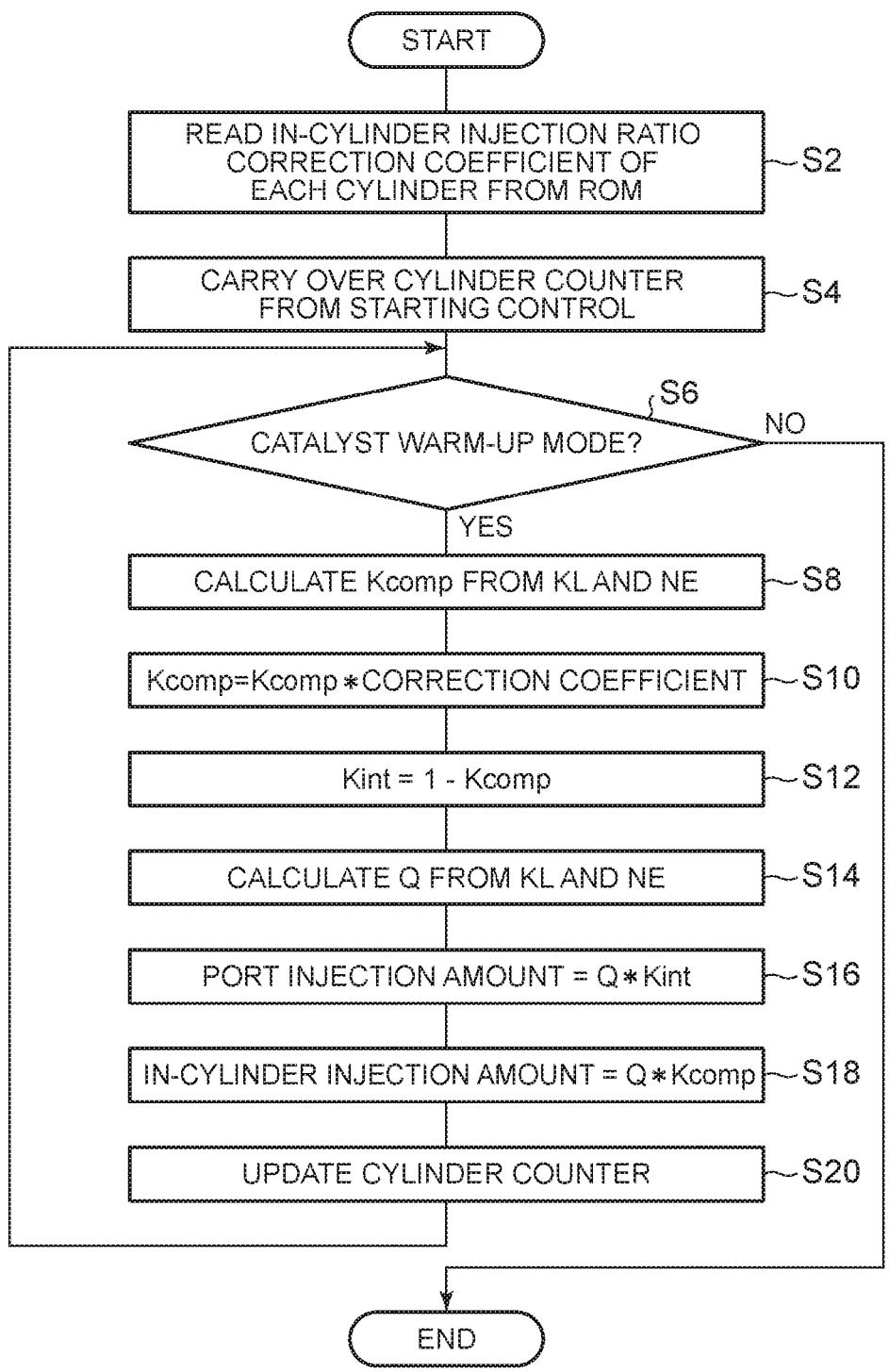
FIG. 9 is a flowchart illustrating control flow of fuel injection control performed in the second embodiment.

FIG. 9 is a flowchart illustrating control flow of fuel injection control performed in this embodiment. In this embodiment, stratified charge combustion operation is performed for the purpose of warm-up of a catalyst. In the stratified charge combustion operation, the in-cylinder injection ratio correction coefficient stored in the ROM is used for calculation of the port injection amount and in-cylinder injection amount of each cylinder 4. In the following, a method of calculating the port injection amount and in-cylinder injection amount of each cylinder 4, using the in-cylinder injection ratio correction coefficient, will be described with reference to the control flow shown in FIG. 9.

Initially, in step S2, the in-cylinder injection ratio correction coefficient of each cylinder 4 stored in the ROM is read into the CPU. Next, in step S4, a cylinder counter that indicates the cylinder currently noted is carried over from starting control. The starting control is fuel injection control executed when the engine is started, and is performed according to control flow different from the control flow of FIG. 9, before catalyst warm-up is carried out. The cylinder counter assumes a value from 1 to 4 in accordance with the number of cylinders of the engine, and returns to 1 after reaching 4.

Then, in step S6, it is determined whether the current operation mode is a catalyst warm-up mode for warming up a catalyst. When the catalyst warm-up mode is cancelled, the fuel injection control according to this control flow ends.

When the current operation mode is the catalyst warm-up mode, step S8 through step S20 are sequentially executed. In step S8, the compression stroke injection ratio as the ratio of the fuel injection amount in the compression stroke is calculated from the engine speed NE and the engine load KL. Since the fuel injection in the compression stroke is performed by the in-cylinder injector 26, the compression stroke injection ratio means the in-cylinder injection ratio.

For this calculation, a map using the engine speed NE and the engine load KL as parameters is used.

In step S10, the compression stroke injection ratio Kcomp calculated in step S8 is multiplied by the in-cylinder injection ratio correction coefficient of the currently noted cylinder indicated by the cylinder counter.

In step S12, the intake stroke injection ratio Kint as the ratio of the fuel injection amount in the intake stroke is calculated by subtracting the compression stroke injection ratio Kcomp corrected in step S10, from 1. Since the fuel injection in the intake stroke is performed by the port injector 24, the intake stroke injection ratio means the port injection ratio.

In step S14, the total fuel injection amount Q in one cycle is calculated from the engine speed NE and the engine load KL. For this calculation, a map using the engine speed NE and the engine load KL as parameters is used.

In step S16, the port injection amount as the fuel injection amount to be provided by the port injector 24 is calculated by multiplying the total fuel injection amount Q calculated in step S14, by the intake stroke injection ratio Kint calculated in step S12.

In step S18, the in-cylinder injection amount as the fuel injection amount to be provided by the in-cylinder injector 26 is calculated by multiplying the total fuel injection amount Q calculated in step S14, by the compression stroke injection ratio Kcomp corrected in step S10.

In step S20, the cylinder counter is updated. When the catalyst warm-up mode is continued, computations from step S8 to step S18 are performed, with respect to the cylinder to be noted next, which is indicated by the cylinder counter that has been updated.

According to the control flow as described above, the in-cylinder injection ratio correction coefficient is individually set for each cylinder 4 according to the height of the narrowed portion 14; therefore, the amount (in-cylinder injection amount) of the fuel injected from the in-cylinder injector 26 against tumble flow is controlled to an amount that provides penetration force that is balanced with the strength of the tumble flow. With this arrangement, even if there are variations in the strength of the tumble flow among the cylinders 4 due to errors in shape of the intake ports 10, the penetration force of the fuel spray of the in-cylinder injector 26 is determined from the beginning in accordance with the variations in the strength of the tumble flow; therefore, the ignition-time around-plug air-fuel ratio as a combustion condition is less likely or unlikely to vary among the cylinders 4. Thus, in the engine of this embodiment, variations in combustion among the cylinders 4 due to variations in the strength of the tumble flow are suppressed or reduced from the time when the engine leaves the production line.

While the in-cylinder injection ratio correction coefficient is determined from the height of the narrowed portion 14 in this embodiment, the port injection ratio or in-cylinder injection ratio may be directly determined from the height of the narrowed portion 14, and may be written into the ROM of the ECU 50. Also, the logic for calculating the in-cylinder injection ratio correction coefficient from the height of the narrowed portion 14 and a measurement value of the height of the narrowed portion 14 for each cylinder 4 are written into the ROM of the ECU 50, and the in-cylinder injection ratio correction coefficient for each cylinder 4 may be calculated by the ECU 50.

An engine according to a third embodiment of the invention has a similar configuration as that of the engine of the first embodiment shown in FIG. 1. However, the engine according to the third embodiment has a mechanism capable of controlling the fuel pressure of the in-cylinder injector 26 (which will be called "in-cylinder injection fuel pressure") for each cylinder 4. This mechanism is not particularly limited. For example, the lift amount of an injection valve of the in-cylinder injector 26 may be set for each cylinder 4, or a fuel pump may be provided for each cylinder 4. Also, as will be described later, the engine according to the third embodiment is different from those of the first and second embodiments, in the content of control parameters stored in the ROM of the ECU 50.

Generally, in any cylinder 4, the fuel is injected at the same pressure from the in-cylinder injector 26. However, if the in-cylinder injection fuel pressure is individually set for each cylinder 4, the balance between the penetration force of the fuel spray and the braking force produced by tumble flow can be controlled for each cylinder 4. If the setting of the in-cylinder injection fuel pressure is set for each cylinder 4 according to the tumble ratio, and the balance between the penetration force of the fuel spray and the braking force produced by tumble flow is controlled for each cylinder 4, so that the fuel concentration around the ignition plug reaches its peak at the ignition timing, the ignition-time around-plug air-fuel ratio is presumed to be substantially uniform or equal among the cylinders 4.

Figure 10:
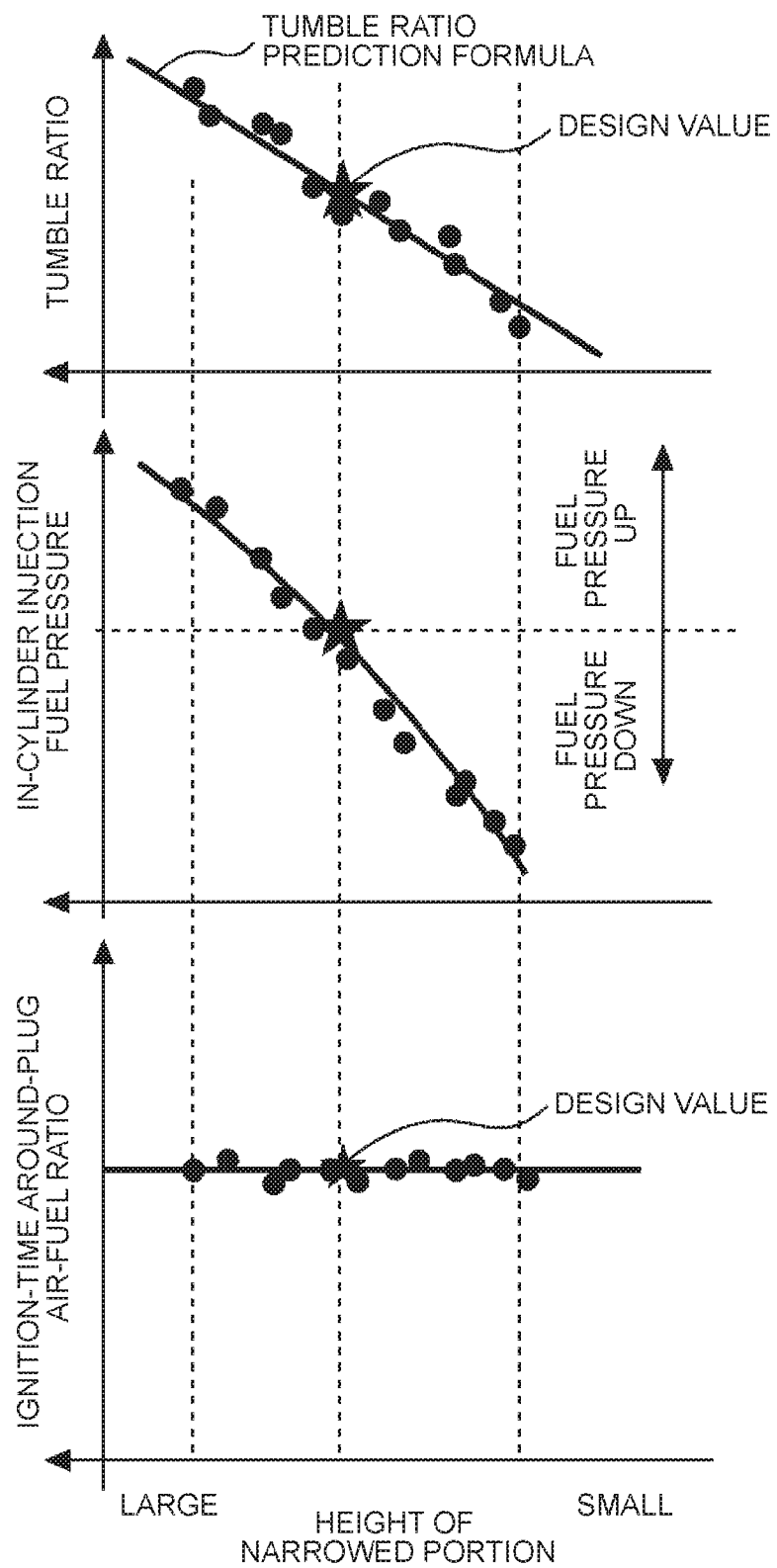
FIG. 10 is a view indicating the relationship between the height of the narrowed portion of the throat of the intake port and the in-cylinder injection fuel pressure, for making the air-fuel ratio of the air-fuel mixture around the ignition plug at the time of ignition uniform or substantially equal among the cylinders.

In FIG. 10, three graphs in which the horizontal axis indicates the height of the narrowed portion 14 are arranged such that their horizontal axes extend in parallel with each other. The upper graph indicates the relationship between the height of the narrowed portion 14 and the tumble ratio. The middle graph indicates the relationship between the height of the narrowed portion 14 and the optimum value of the in-cylinder injection fuel pressure. Since there is a relationship expressed by a secondary function, between the in-cylinder injection fuel pressure and the penetration force of the fuel spray, the relationship between the height of the narrowed portion 14 and the optimum value of the fuel injection pressure is not linear, but is expressed by a gentle curve that is convex upward. The lower graph indicates the relationship between the height of the narrowed portion 14, and the ignition-time around-plug air-fuel ratio when the in-cylinder injection fuel pressure is set to a value indicated in the middle graph. Black circles indicated in each graph are data obtained by conducting an experiment in which the height of the narrowed portion 14 is varied. It is understood from FIG. 10 that the ignition-time around-plug air-fuel ratio can be controlled to be substantially equal to the design value by changing setting of the in-cylinder injection fuel pressure according to the height of the narrowed portion 14.

In the production process of the engine of this embodiment, the relationship between the height of the narrowed portion 14 and the optimum value of the in-cylinder injection fuel pressure indicated in the middle graph of FIG. 10 is prepared in advance as reference data for determining the in-cylinder injection fuel pressure for each cylinder 4. The in-cylinder injection fuel pressure adequate as a set value during stratified charge combustion operation can be determined for each cylinder 4 from the reference data and the height of the narrowed portion 14 measured for each cylinder 4. The thus determined in-cylinder injection fuel pressure for each cylinder 4 is written as a set value (initial set value) in the ROM of the ECU 50.

Figure 11:
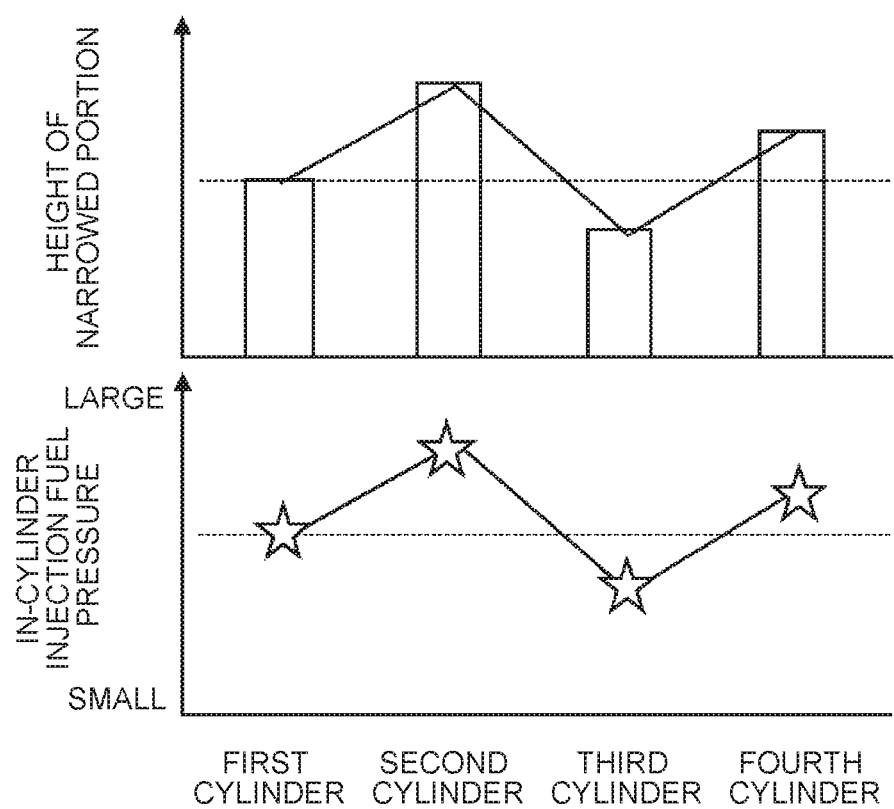
FIG. 11 is a view indicating one example of the relationship between a set value of the in-cylinder injection fuel pressure of each cylinder stored in ROM of a third embodiment of the invention, and the height of the narrowed portion of the throat of the intake port of each cylinder.

FIG. 11 shows one example of the relationship between the height of the narrowed portion 14 of each cylinder 4, and the set value of the in-cylinder injection fuel pressure of each cylinder 4 stored in the ROM. In this example, the engine is a four-cylinder engine, and the upper graph indicates the height of the narrowed portion 14 for each cylinder 4, while the lower graph indicates the set value of the in-cylinder injection fuel pressure for each cylinder 4. If the first cylinder is denoted as a reference cylinder, and a distribution (indicated by a broken line in the lower graph) among cylinders, of a difference of the set value of the in-cylinder injection fuel pressure of each cylinder from the set value of the in-cylinder injection fuel pressure of the reference cylinder is compared with a distribution (indicated by a broken line in the upper graph) among cylinders, of a difference of the height of the narrowed portion 14 of each cylinder from the height of the narrowed portion 14 of the reference cylinder, it can be confirmed that there is a common regularity between the two distributions. At least when a vehicle is operated for the first time after leaving the production line, setting (initial setting) the in-cylinder injection fuel pressure is performed according to the set value stored in the ROM. In a comparison of two cylinders out of the four cylinders included in the engine, the in-cylinder injection fuel pressure of the cylinder with the narrowed portion 14 having the smaller height is set to a smaller value than the in-cylinder injection fuel pressure of the cylinder with the narrowed portion 14 having the larger height.

Thus, if the in-cylinder injection fuel pressure is individually set for each cylinder 4 according to the height of the narrowed portion 14, the ignition-time around-plug air-fuel ratio as a combustion condition can be made substantially equal among the cylinders 4, irrespective of variations in the strength of tumble flow among the cylinders 4. Thus, in the engine of this embodiment, even if the strength of tumble flow varies among the cylinders 4 due to errors in shape of the intake ports 10, variations in combustion among the cylinders 4 caused by variations in the strength of tumble flow are suppressed or reduced from the time when the engine leaves the production line.

While the in-cylinder injection fuel pressure is determined from the height of the narrowed portion 14 in this embodiment, a correction coefficient for a design value of the in-cylinder injection fuel pressure (or a design value of the lift amount of the injection valve of the in-cylinder injector 26) may be determined from the height of the narrowed portion 14. The correction coefficient assumes a value for increasing the in-cylinder injection fuel pressure to a value larger than the design value when the height of the narrowed portion 14 is larger than the design value, and assumes a value for reducing the in-cylinder injection fuel pressure to a value smaller than the design value when the height of the narrowed portion 14 is smaller than the design value. The correction coefficient is determined for each cylinder 4 from the height of the narrowed portion 14, and is written into the ROM of the ECU 50 along with the design value of the in-cylinder injection fuel pressure. The ECU 50 corrects the design value of the in-cylinder injection fuel pressure with the correction coefficient for each cylinder 4, and uses the corrected in-cylinder injection fuel pressure as a set value of the in-cylinder injection fuel pressure for each cylinder 4. Also, the logic for calculating the set value of the in-cylinder injection fuel pressure from the height of the narrowed portion 14 and a measurement value of the height of the narrowed portion 14 of each cylinder 4 may be written into the ROM of the ECU 50, and the set value of the in-cylinder injection fuel pressure for each cylinder 4 may be calculated by the ECU 50.

Figure 12:
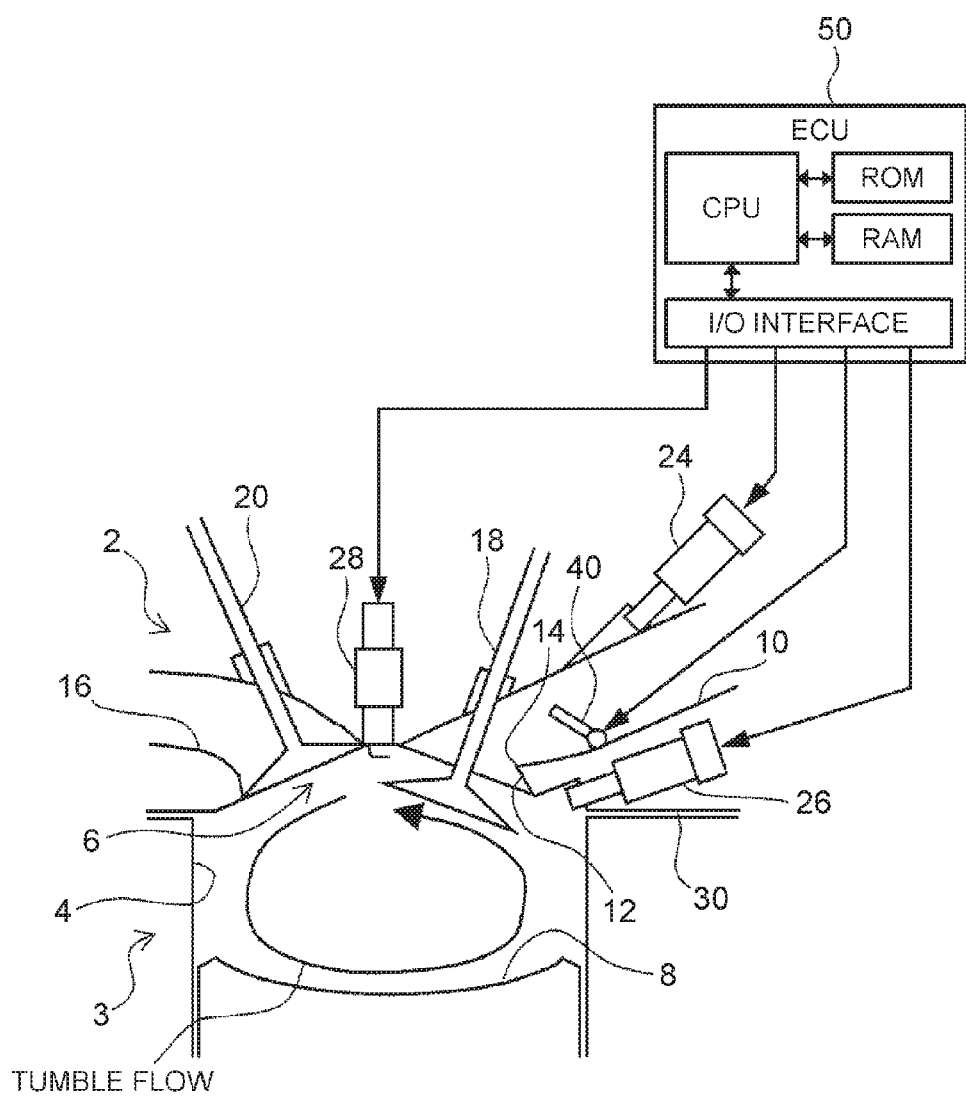
FIG. 12 is a view schematically showing the configuration of a multicylinder engine according to a fourth embodiment of the invention.

FIG. 12 is a view schematically showing the configuration of an engine according to a fourth embodiment of the invention. In FIG. 12, the same reference numerals as used in FIG. 1 are assigned to the same or corresponding portions and components as those of the engine of the first embodiment shown in FIG. 1. The engine according to the fourth embodiment includes all of the portions and components included in the engine according to the first embodiment, and further includes a tumble control valve 40. The tumble control valve 40 is provided on the bottom of the intake port 10 of each cylinder 4, and is operable to change its rising angle relative to the bottom, so as to control the strength of tumble flow produced in the combustion chamber 6. The tumble control valves 40 included in the engine according to the fourth embodiment are configured such that the rising angle of each tumble control valve 40 differs from one cylinder 4 to another. For example, the tumble control valve 40 may be arranged to be driven by a motor for each cylinder 4. Also, as will be described later, the engine according to the fourth embodiment is different from those of the first through third embodiments in the content of control parameters stored in the ROM of the ECU 50.

Each of the intake ports 10 included in the engine of this embodiment is a tumble production port that produces tumble flow in the corresponding combustion chamber 6. The tumble control valve 40 is able to further increase the strength of the tumble flow produced by the intake port 10. As the rising angle of the tumble control valve 40 becomes closer to a right angle relative to the bottom of the intake port 10, the strength of the tumble flow produced in the combustion chamber 6 increases.

In the related art, the tumble control valve 40 is controlled to the same rising angle in any cylinder 4. However, if the rising angle of the tumble control valve 40 is individually set for each cylinder 4, the strength of the tumble flow can be controlled for each cylinder 4. If there are variations in the height of the narrowed portion 14 among the cylinders 4, variations in the strength of the tumble flow among the cylinders 4 can be suppressed or reduced by changing the rising angle of the tumble control valve 40 for each cylinder 4, according to the height of the narrowed portion 14.

Figure 13:
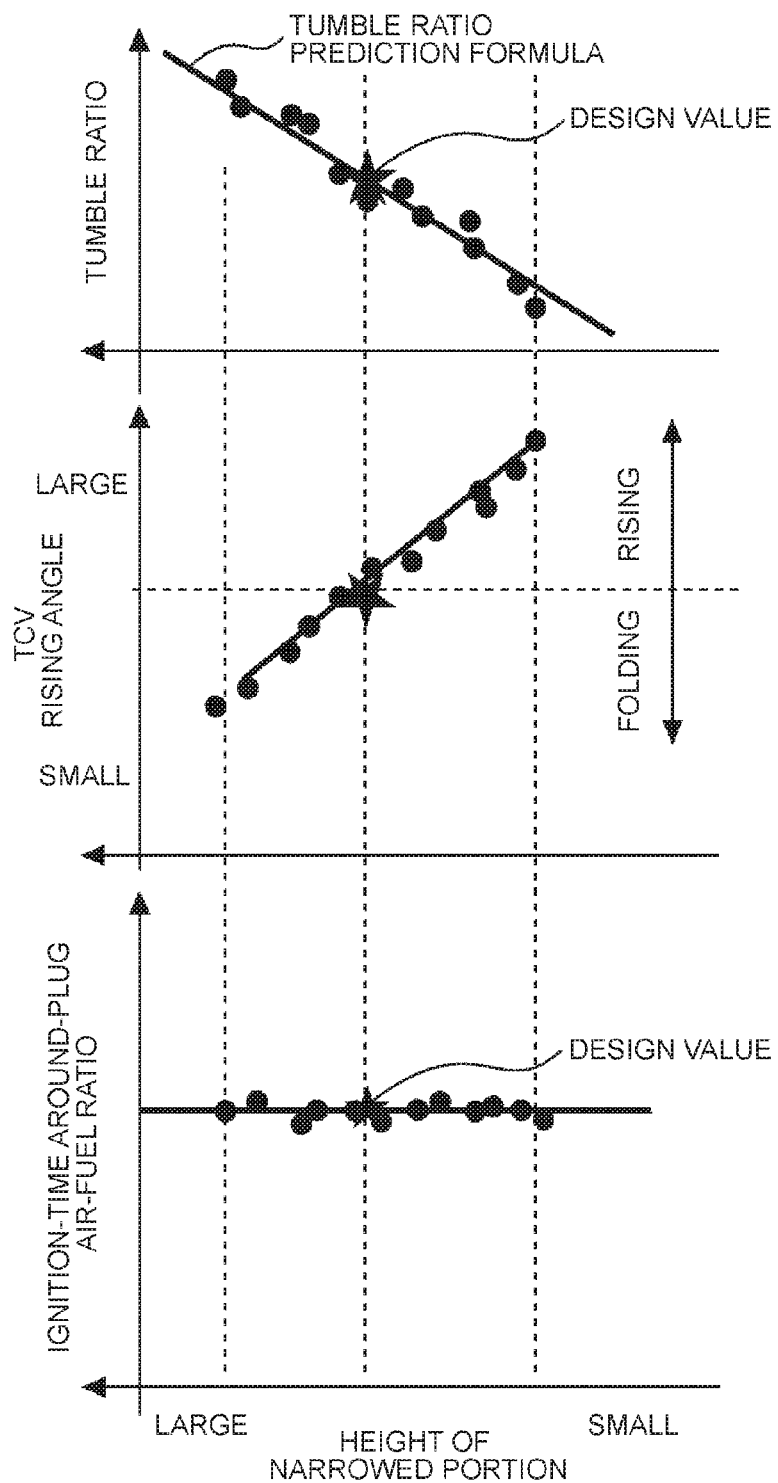
FIG. 13 is a view indicating the relationship between the height of the narrowed portion of the throat of the intake port and the rising angle of a tumble control valve, for making the air-fuel ratio of the air-fuel mixture around the ignition plug at the time of ignition uniform or substantially equal among the cylinders.

In FIG. 13, three graphs in which the horizontal axis indicates the height of the narrowed portion 14 are arranged such that their horizontal axes extend in parallel with each other. The upper graph indicates the relationship between the height of the narrowed portion 14 and the tumble ratio in the case where the tumble control valve 40 lies flat on the bottom of the intake port 10 (where the tumble control valve 40 does not act on tumble flow). The middle graph indicates the relationship between the height of the narrowed portion 14 and the optimum value of the rising angle of the tumble control valve 40 (which will be denoted as "TCV rising angle"). The height of the narrowed portion 14 and the optimum value of the TCV rising angle have a linear relationship. The lower graph indicates the relationship between the height of the narrowed portion 14 and the ignition-time around-plug air-fuel ratio in the case where the TCV rising angle is set to a value indicated in the middle graph. Black circles indicated in each graph are data obtained by conducting an experiment in which the height of the narrowed portion 14 is varied. It is understood from FIG. 12 that the ignition-time around-plug air-fuel ratio can be controlled to be substantially equal to the design value by changing setting of the TCV rising angle according to the height of the narrowed portion 14.

In this embodiment, as a specific method of changing the setting of the rising angle of the tumble control valve 40 for each cylinder 4, a base value of the TCV rising angle is multiplied by a TCV rising angle correction coefficient set for each cylinder 4. The base value of the TCV rising angle is a variable value that is varied according to the engine speed and the engine load, for example, and a common value is used as the base value among the cylinders 4. When the height of the narrowed portion 14 is equal to the design value, the value of the TCV rising angle correction coefficient is set to 1. When the height of the narrowed portion 14 is larger than the design value, the TCV rising angle correction coefficient is set to a value smaller than 1, and the value of the TCV rising angle correction coefficient is reduced to be smaller as the height of the narrowed portion 14 is larger. Conversely, when the height of the narrowed portion 14 is smaller than the design value, the TCV rising angle correction coefficient is set to a value larger than 1, and the value of the TCV rising angle correction coefficient is increased to be larger as the height of the narrowed portion 14 is smaller. It is thus possible to make the strength of the tumble flow produced in the combustion chamber 6 close to the design value, by changing the value of the TCV rising angle correction coefficient according to the height of the narrowed portion 14.

In the production process of the engine of this embodiment, the relationship between the height of the narrowed portion 14 and the optimum value of the TCV rising angle correction coefficient, which was previously determined, is prepared in advance as reference data used for determining the TCV rising angle correction coefficient for each cylinder 4. The TCV rising angle correction coefficient adequate for determining the set value of the TCV rising angle during stratified charge combustion operation can be determined for each cylinder 4 from the reference data and the height of the narrowed portion 14 measured for each cylinder 4. The thus determined TCV rising angle correction coefficient for each cylinder 4 is written into the ROM of the ECU 50.

Figure 14:
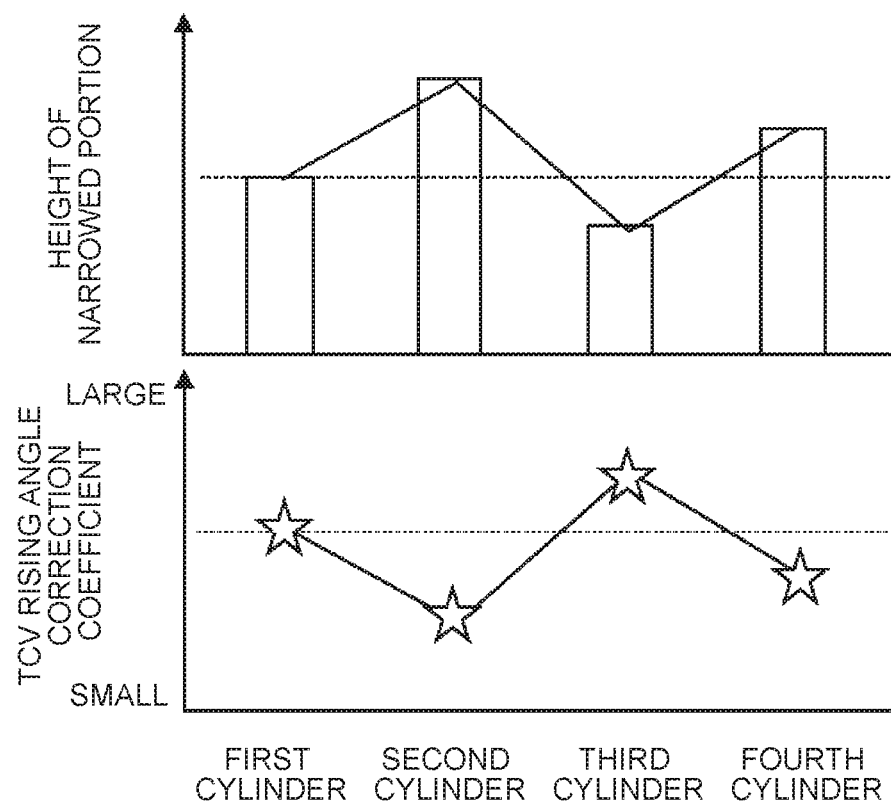
FIG. 14 is a view indicating one example of the relationship between a set value of a TCV rising angle correction coefficient of each cylinder stored in ROM of the fourth embodiment, and the height of the narrowed portion of the throat of the intake port of each cylinder.

FIG. 14 shows one example of the relationship between the height of the narrowed portion 14 of each cylinder 4 and the TCV rising angle correction coefficient of each cylinder 4 stored in the ROM. In this example, the engine is a four-cylinder engine, and the upper graph indicates the height of the narrowed portion 14 for each cylinder 4, while the lower graph indicates the TCV rising angle correction coefficient for each cylinder 4. If a first cylinder is denoted as a reference cylinder, and a distribution (indicated by a broken line in the lower graph) among cylinders, of a difference of the TCV rising angle correction coefficient of each cylinder from the TCV rising angle correction coefficient of the reference cylinder is compared with a distribution (indicated by a broken line in the upper graph) among cylinders, of a difference of the height of the narrowed portion 14 of each cylinder from the height of the narrowed portion 14 of the reference cylinder, it can be confirmed that there is a common regularity between the two distributions. At least when a vehicle is operated for the first time after leaving the production line, setting (initial setting) the TCV rising angle is conducted using the TCV rising angle correction coefficient stored in the ROM. According to the initial setting, in a comparison of two cylinders out of the four cylinders included in the engine, the TCV rising angle of the cylinder with the narrowed portion 14 having the smaller height is set to a larger value than the TCV rising angle of the cylinder with the narrowed portion 14 having the larger height.

Thus, the TCV rising angle correction coefficient is individually set for each cylinder 4 according to the height of the narrowed portion 14, so that the TCV rising angle can be individually set for each cylinder 4 and the strength of the tumble flow can be made uniform or equal among the cylinders 4. Thus, in the engine of this embodiment, variations in combustion among the cylinders 4 caused by variations in the strength of tumble flow are suppressed or reduced from the time when the engine leaves the production line.

While the TCV rising angle correction coefficient is determined from the height of the narrowed portion 14 in this embodiment, the TCV rising angle may be directly determined from the narrowed portion 14, and may be written into the ROM of the ECU 50. Also, the logic for calculating the TCV rising angle correction coefficient from the height of the narrowed portion 14 and a measurement value of the height of the narrowed portion 14 of each cylinder 4 may be written into the ROM of the ECU 50, and the TCV rising angle correction coefficient for each cylinder 4 may be calculated by the ECU 50.

In the meantime, the flow coefficient of the intake port 10 changes if the TCV rising angle changes. Therefore, when the TCV rising angle is individually set for each cylinder 4, variations may arise in the intake air amount among the cylinders 4. Accordingly, it is preferable to provide a throttle for each cylinder 4, and control the throttle opening for each cylinder 4 according to the TCV rising angle, so that the intake air amount does not vary among the cylinders 4. In another example, it is preferable to provide a variable valve lift device for making the maximum lift amount of the intake valve 18 variable, and control the maximum lift amount of the intake valve 18 for each cylinder 4, according to the TCV rising angle. In this connection, a correction coefficient for correcting the throttle opening (or the maximum lift amount of the intake valve 18) for each cylinder 4 is preferably written in advance in the ROM of the ECU 50, along with the TCV rising angle correction coefficient.

An engine according to a fifth embodiment of the invention has a similar configuration as that of the engine of the first embodiment shown in FIG. 1. However, the engine according to the fifth embodiment is able to perform homogeneous combustion operation to homogeneously mix fuel and air and burn the resulting mixture using port injection by the port injector 24 or in-cylinder injection in the intake stroke by the in-cylinder injector 26. Also, in the fifth embodiment, a modified example in which only the port injector 24 or only the in-cylinder injector 26 is provided, or a modified example in which the in-cylinder injector 26 is provided at the top of the combustion chamber 6, may be employed. Also, as will be described later, the engine according to the fifth embodiment is different from those of the first to fourth embodiments in the content of control parameters stored in the ROM of the ECU 50.

Figure 15:
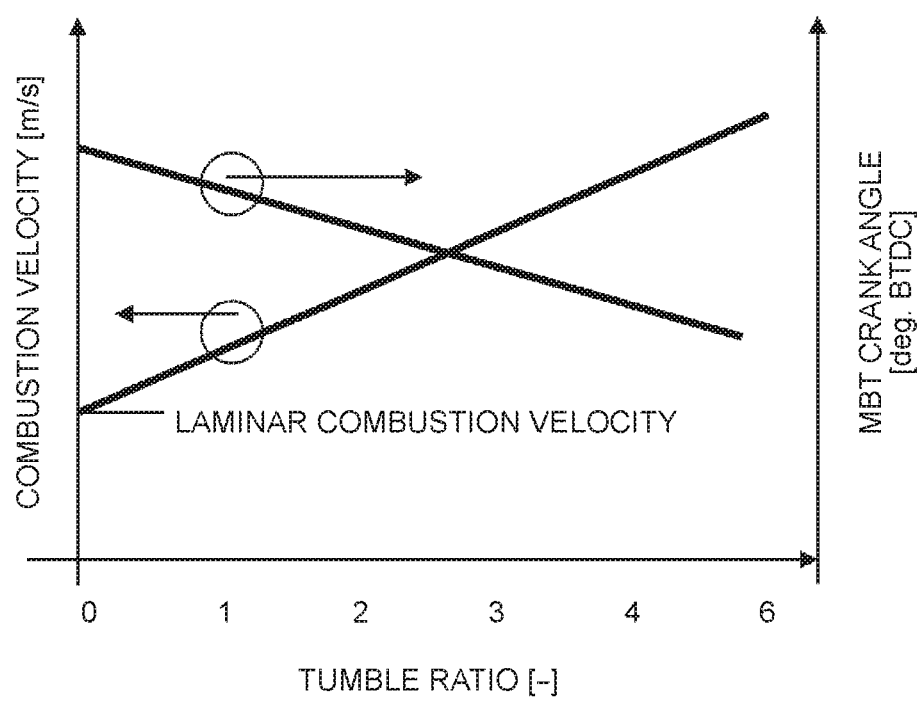
FIG. 15 is a view indicating the relationship among the tumble ratio, combustion velocity, and the MBT crank angle, in homogeneous combustion operation.

FIG. 15 shows the relationship between the tumble ratio and the combustion velocity in homogeneous combustion operation, when the engine speed and the engine load are fixed. When the tumble ratio is equal to zero, the flow of the air-fuel mixture in the combustion chamber 6 becomes laminar flow with no turbulence; therefore, the combustion velocity becomes lowest. As the tumble ratio is higher, the turbulence of the flow of the air-fuel mixture in the combustion chamber 6 becomes larger, so that the combustion velocity becomes higher.

FIG. 15 also indicates the relationship between the tumble ratio and the MBT crank angle in homogeneous combustion operation when the engine speed and the engine load are fixed. The MBT crank angle depends on the combustion velocity. The MBT crank angle is advanced away from TDC as the combustion velocity is lower, and the MBT crank angle becomes closer to TDC as the combustion velocity is higher. Thus, as shown in FIG. 15, the MBT crank angle is most advanced when the tumble ratio is equal to zero, and the MBT crank angle becomes closer to TDC as the tumble ratio becomes higher. There is a linear relationship between the tumble ratio and the MBT crank angle.

In the related art, a value (design value) that is standardized among the cylinders 4 is used as the basic ignition timing (ignition timing that provides a basis for ignition timing control) during homogeneous combustion operation, in particular, the basic ignition timing that is initially set without being learned or corrected based on operation results. However, if the strength of tumble flow varies among the cylinders 4, the MBT crank angle also varies among the cylinders 4. As described above, there is a certain relationship between the tumble ratio indicating the strength of tumble flow and the height of the narrowed portion 14 of the throat 12 of the intake port 10. If the basic ignition timing is individually set for each cylinder 4, according to the height of the narrowed portion 14, based on this relationship, and the relationship between the tumble ratio and the MBT crank angle shown in FIG. 15, the basic ignition timing can be matched with the MBT crank angle in each cylinder 4.

In the production process of the engine of this embodiment, the relationship between the height of the narrowed portion 14 and the MBT crank angle, which was previously determined, is prepared in advance as reference data for determining the basic ignition timing for each cylinder 4. The set value of the basic ignition timing during homogeneous combustion operation can be determined for each cylinder 4 from the reference data and the measured height of the narrowed portion 14. The thus determined basic ignition timing for each cylinder 4 is written as a set value (initial set value) into the ROM of the ECU 50 that is linked with the cylinder head 2 of which the height of the narrowed portion 14 was measured.

Figure 16:
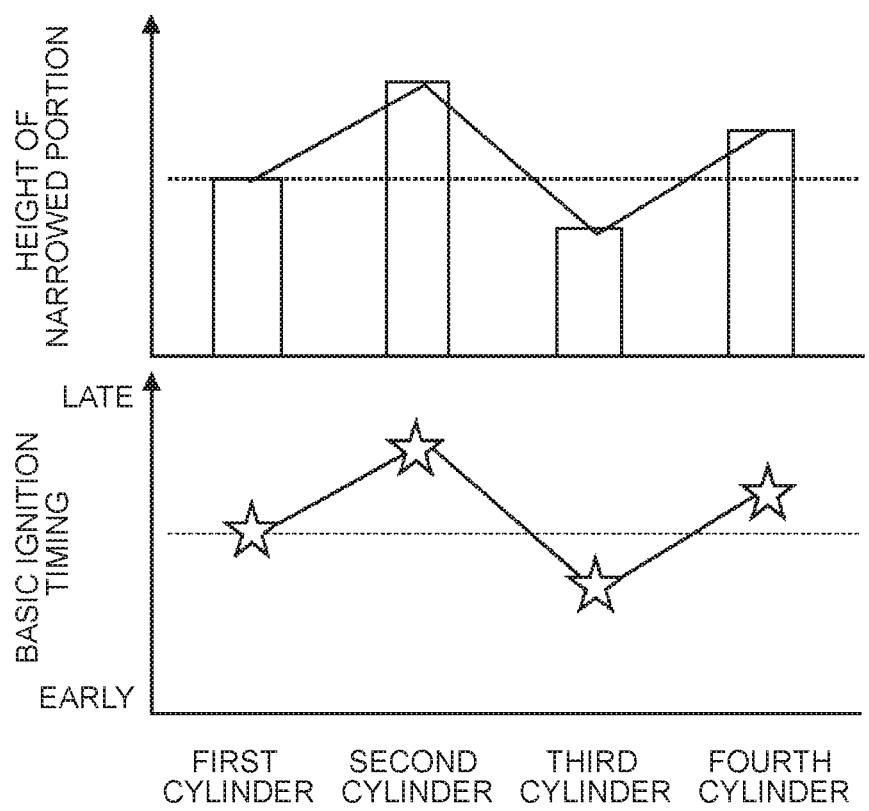
FIG. 16 is a view indicating one example of the relationship between a set value of the basic ignition timing of each cylinder stored in ROM of a fifth embodiment of the invention, and the height of the narrowed portion of the throat of the intake port of each cylinder.

FIG. 16 shows one example of the relationship between the height of the narrowed portion 14 of each cylinder 4 and the set value of the basic ignition timing of each cylinder 4 stored in the ROM. In this example, the engine is a four-cylinder engine, and the upper graph indicates the height of the narrowed portion 14 for each cylinder 4, while the lower graph indicates the set value of the basic ignition timing for each cylinder 4. If a first cylinder is denoted as a reference cylinder, and a distribution (indicated by a broken line in the lower graph) among cylinders, of a difference of the set value of the basic ignition timing of each cylinder from the set value of the basic ignition timing of the reference cylinder is compared with a distribution (indicated by a broken line in the upper graph) among cylinders, of a difference of the height of the narrowed portion 14 of each cylinder from the height of the narrowed portion 14 of the reference cylinder, it can be confirmed that there is a common regularity between the two distributions. At least when a vehicle is operated for the first time after leaving the production line, setting (initial setting) the basic ignition timing is performed according to the set values stored in the ROM. According to the initial setting, in a comparison of two cylinders out of the four cylinders included in the engine, the ignition timing of the cylinder with the narrowed portion 14 having the smaller height is set to be more advanced than the ignition timing of the cylinder with the narrowed portion 14 having the larger height.

Thus, if the basic ignition timing of each cylinder 4 is individually set according to the height of the narrowed portion 14, the ignition timing during homogeneous combustion operation can be made close to the MBT crank angle, no matter whether the cylinder 4 in question is a cylinder in which strong tumble flow is generated or a cylinder in which weak tumble flow is generated. Thus, according to this engine, even when the strength of tumble flow varies among the cylinders 4 due to errors in shape of the intake ports 10, variations in combustion among the cylinders 4 caused by the variations in the strength of tumble flow can be suppressed or reduced from the time when the engine leaves the production line.

While the basic ignition timing is determined from the height of the narrowed portion 14 in this embodiment, a correction coefficient for the design value of the basic ignition timing may be determined from the height of the narrowed portion 14. The correction coefficient is determined for each cylinder 4 from the height of the narrowed portion 14 and is written into the ROM of the ECU 50, along with the design value of the basic ignition timing. The ECU 50 corrects the design value of the basic ignition timing with the correction coefficient for each cylinder 4, and uses the corrected basic ignition timing as the set value of the basic ignition timing for each cylinder 4. Also, the logic for calculating the set value of the basic ignition timing from the height of the narrowed portion 14 and a measurement value of the height of the narrowed portion 14 for each cylinder, may be written into the ROM of the ECU 50, and the set value of the basic ignition timing for each cylinder 4 may be calculated by the ECU 50.

What is claimed is:

1. A multicylinder engine comprising:
   a plurality of intake ports each connected to a different cylinder of the multicylinder engine and having a throat including a narrowed portion, such that tumble flow is produced in a combustion chamber of each of the cylinders of the multicylinder engine, and a distance between the narrowed portion and a lower surface of a cylinder head of the multicylinder engine varies among the cylinders of the multicylinder engine;
   a plurality of in-cylinder injectors each provided in a different cylinder of the multicylinder engine, with each of the in-cylinder injectors being configured to inject a fuel against the tumble flow in the combustion chamber, such that stratified charge combustion operation using fuel injection by the in-cylinder injector is performed; and
   an electronic control unit configured to initially set a value of a control parameter of the multicylinder engine, individually for each of the cylinders, such that there is a common regularity between a distribution among the cylinders, of a difference of the value of the control parameter of each of the cylinders from the value of the control parameter of a reference cylinder, and a distribution among the cylinders, of a difference of the distance of the narrowed portion of each of the cylinders from the distance of the narrowed portion of a reference cylinder, the control parameter being a parameter that determines an air-fuel ratio of an air-fuel mixture around an ignition plug at a time of ignition in the stratified charge combustion operation of the multicylinder engine.

2. The multicylinder engine according to claim 1, wherein:
   the control parameter is an ignition timing during the stratified charge combustion operation; and
   the electronic control unit is configured to initially set a value of the control parameter of the multicylinder engine individually for each of the cylinders, such that, in a comparison of two cylinders out of the plurality of cylinders, the ignition timing of the one of the two cylinders with the narrowed portion having a smaller distance is set to be more advanced than the ignition timing of the other cylinder with the narrowed portion having a larger distance.

3. The multicylinder engine according to claim 1, further comprising:
   a plurality of port injectors each provided in the intake port of a different cylinder, wherein:
   the port injectors are configured to inject fuel into the intake ports;
   the control parameter is a ratio of a fuel injection amount provided by a port injector during the stratified charge combustion operation; and
   the electronic control unit is configured to initially set a value of the control parameter of the multicylinder engine individually for each of the cylinders, such that, in a comparison of two cylinders out of the plurality of cylinders, the ratio of the one of the two cylinders with the narrowed portion having a smaller distance is set to be larger than the ratio of the other cylinder with the narrowed portion having a larger distance.

4. The multicylinder engine according to claim 1, wherein:
   the control parameter is a fuel injection pressure of an in-cylinder injector during the stratified charge combustion operation; and
   the electronic control unit is configured to initially set a value of the control parameter of the multicylinder engine individually for each of the cylinders, such that, in a comparison of two cylinders out of the plurality of cylinders, the fuel injection pressure of the one of the two cylinders with the narrowed portion having a smaller distance is set to be smaller than the fuel injection pressure of the other cylinder with the narrowed portion having a larger distance.

5. The multicylinder engine according to claim 1, further comprising:
   a plurality of tumble control valves each disposed in the intake port of a different cylinder, wherein:
   the tumble control valves are configured to change a strength of the tumble flow in the combustion chambers, such that the tumble flow becomes stronger as a rising angle of a tumble control valve is larger;
   the control parameter is the rising angle of a tumble control valve during the stratified charge combustion operation; and
   the electronic control unit is configured to initially set a value of the control parameter of the multicylinder engine individually for each of the cylinders, such that, in a comparison of two cylinders out of the plurality of cylinders, the rising angle of the one of the two cylinders with the narrowed portion having a smaller distance is set to be larger than the rising angle of the other cylinder with the narrowed portion having a larger distance.

6. A multicylinder engine comprising:
   a plurality of intake ports each connected to a different cylinder of the multicylinder engine and having a throat including a narrowed portion, such that tumble flow is produced in a combustion chamber of each of the cylinders of the multicylinder engine, and a distance between the narrowed portion and a lower surface of a cylinder head of the multicylinder engine varies among the cylinders of the multicylinder engine; and
   an electronic control unit configured to initially set a value of ignition timing during homogeneous combustion operation of the multicylinder engine, individually for each of cylinders, such that, in a comparison of two cylinders out of the plurality of cylinders, the ignition timing of the one of the two cylinders with the narrowed portion having a smaller distance during the homogeneous combustion operation is set to be more advanced than the ignition timing of the other cylinder with the narrowed portion having a larger distance during the homogeneous combustion operation.

* * * * *